(12) United States Patent
Koch et al.

(10) Patent No.: US 11,678,600 B2
(45) Date of Patent: Jun. 20, 2023

(54) SEED TRENCH CLOSING SENSORS

(71) Applicant: Precision Planting LLC, Tremont, IL (US)

(72) Inventors: Dale Koch, Tremont, IL (US); Jason Stoller, Eureka, IL (US); Todd Swanson, Morton, IL (US); Michael Strnad, Delavan, IL (US); Matthew Morgan, Peoria, IL (US); Ian Radtke, Washington, IL (US); Timothy Kater, Bloomington, IL (US); Jeremy Hodel, Morton, IL (US)

(73) Assignee: Precision Planting LLC, Tremont, IL (US)

( * ) Notice: Subject to any disclaimer, the term of this patent is extended or adjusted under 35 U.S.C. 154(b) by 559 days.

(21) Appl. No.: 16/764,770

(22) PCT Filed: Nov. 15, 2018

(86) PCT No.: PCT/US2018/061388
§ 371 (c)(1),
(2) Date: May 15, 2020

(87) PCT Pub. No.: WO2019/099748
PCT Pub. Date: May 23, 2019

(65) Prior Publication Data
US 2020/0359559 A1   Nov. 19, 2020

Related U.S. Application Data

(60) Provisional application No. 62/672,993, filed on May 17, 2018, provisional application No. 62/640,279, (Continued)

(51) Int. Cl.
*A01C 5/06* (2006.01)
*A01C 7/20* (2006.01)
(Continued)

(52) U.S. Cl.
CPC .............. *A01C 5/068* (2013.01); *A01B 47/00* (2013.01); *A01C 7/105* (2013.01); *A01C 7/203* (2013.01); *A01C 7/205* (2013.01)

(58) Field of Classification Search
CPC ......... A01C 5/066; A01C 5/068; A01C 7/105; A01C 7/203; A01C 7/205; A01B 47/00
See application file for complete search history.

(56) References Cited

U.S. PATENT DOCUMENTS 3,955,412 A   5/1976   Niskin
4,187,916 A   2/1980   Harden et al.
(Continued)

FOREIGN PATENT DOCUMENTS

DE   234 932 A1   4/1986
EP   181425 B1   6/1988
(Continued)

OTHER PUBLICATIONS

USPTO, International Search Report prepared for International Application No. PCT/US2018/061388, claims 1-16 and 33-43, dated Apr. 30, 2019.
(Continued)

*Primary Examiner* — Thomas B Will
*Assistant Examiner* — Ian A Normile

(57) ABSTRACT

A system for sensing characteristics of a trench in a soil surface during planting operations. A trench opening assembly opens a trench in the soil surface as the trench opening assembly moves in a forward direction of travel. A trench closing assembly disposed rearward of the trench opening assembly closes the opened trench with soil. One or more sensors may be disposed on an appurtenance disposed in said trench configured to provide characteristics of an area of the open trench or an area of the trench closed with soil by the trench closing assembly or a sensor may be disposed
(Continued)

outside of said trench configured to provide characteristics of an area of the trench closed with soil or a combination of the sensors may be disposed in the trench and outside of the trench.

27 Claims, 28 Drawing Sheets

Related U.S. Application Data filed on Mar. 8, 2018, provisional application No. 62/586,397, filed on Nov. 15, 2017.

(51) Int. Cl.
    *A01B 47/00*      (2006.01)
    *A01C 7/10*      (2006.01)

(56) References Cited

U.S. PATENT DOCUMENTS

| | | |
|---|---|---|
| 6,070,539 A | 6/2000 | Flamme et al. |
| 6,386,127 B1 | 5/2002 | Prairie et al. |
| 8,561,472 B2 | 10/2013 | Sauder et al. |
| 8,862,339 B2 | 10/2014 | Henry et al. |
| 2003/0184747 A1 | 10/2003 | Diekhans et al. |
| 2007/0272134 A1 | 11/2007 | Baker et al. |
| 2012/0232691 A1 | 9/2012 | Green et al. |
| 2014/0041563 A1 | 2/2014 | Henry et al. |
| 2014/0365084 A1 | 12/2014 | Chan et al. |
| 2015/0264857 A1 | 9/2015 | Achen et al. |
| 2015/0271986 A1 | 10/2015 | Sauder et al. |
| 2015/0289438 A1 | 10/2015 | Sauder et al. |
| 2016/0037709 A1 | 2/2016 | Sauder et al. |
| 2017/0049044 A1 | 2/2017 | Stoller et al. |
| 2017/0094889 A1 | 4/2017 | Garner et al. |
| 2018/0184581 A1* | 7/2018 | Morgan ............... A01C 5/068 |

FOREIGN PATENT DOCUMENTS

| | | |
|---|---|---|
| WO | 2017/049186 A1 | 3/2017 |
| WO | 2017/197274 A1 | 11/2017 |
| WO | 2018/075788 A1 | 4/2018 |

OTHER PUBLICATIONS

European Patent Office, Search Report for related European Application No. EP 18 87 8838, dated Dec. 17, 2020.

\* cited by examiner (Top View)

SEED TRENCH CLOSING SENSORS

BACKGROUND

It is well known that good seed-to-soil contact within the seed trench is a critical factor in uniform seed emergence and high yields. While conducting spot checks of the seed trench may help to provide some assurances that these critical factors are being achieved, such spot checks will only identify the conditions at the specific location being checked. Accordingly, there is a need for a system that will verify that good seed-to-soil contact is being achieved during planting operations and to enable automatic or remote adjustment of the planter while on-the-go.

DESCRIPTION

Figure 1:
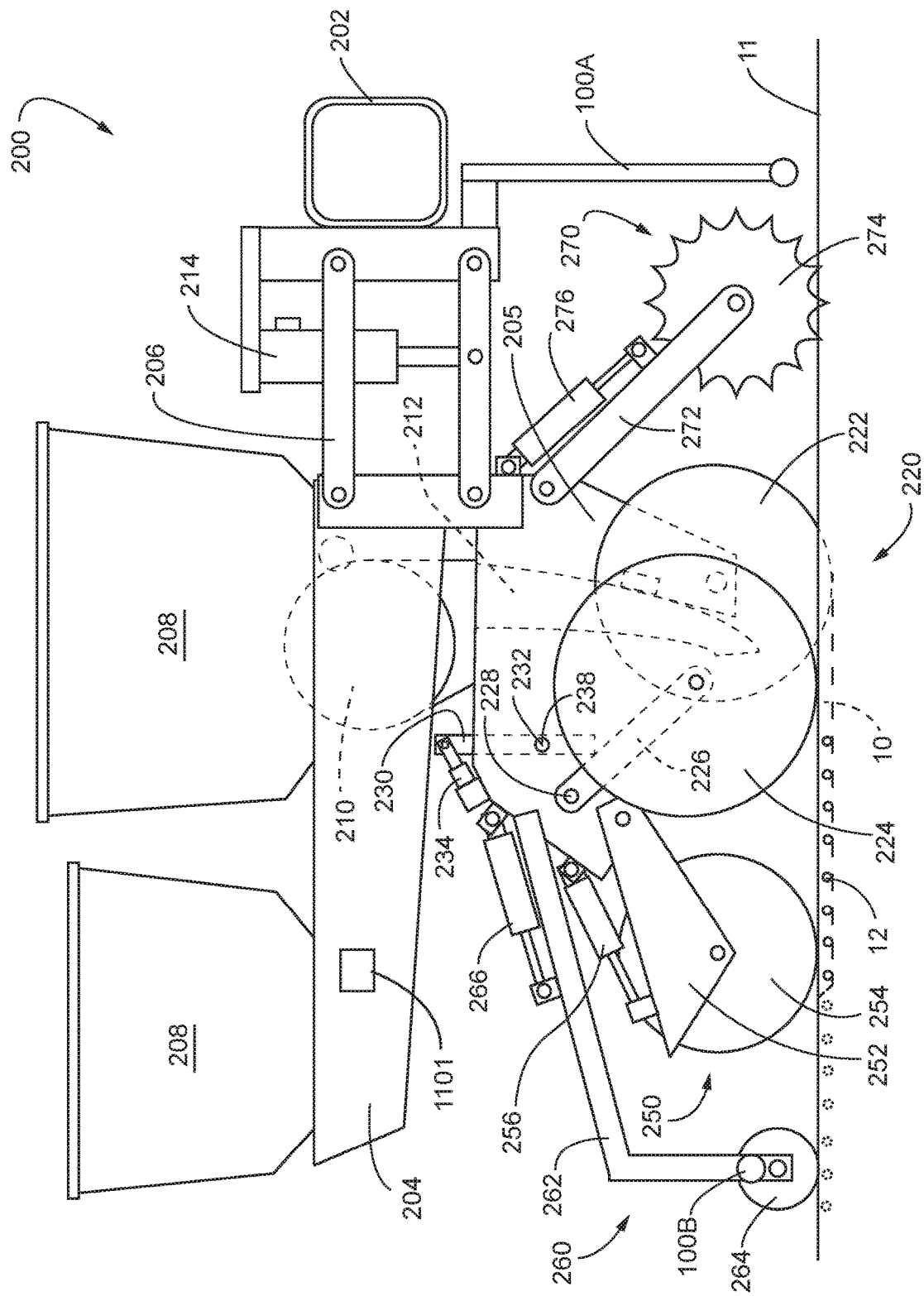
FIG. 1 is a side elevation view of an embodiment of a row unit of an agricultural planter.

Referring now to the drawings, wherein like reference numerals designate identical or corresponding parts throughout the several views, FIG. 1 illustrates an embodiment of an agricultural planter row unit 200. The row unit 200 is comprised of a frame 204 pivotally connected to a toolbar 202 by a parallel linkage 206 enabling each row unit 200 to move vertically independently of the toolbar 202. The frame 204 may operably support one or more hoppers 208, a seed meter 210, a seed delivery mechanism 212, a downforce control system 214, a seed trench opening assembly 220, a trench closing assembly 250, a packer wheel assembly 260, and a row cleaner assembly 270. It should be understood that the row unit 200 shown in FIG. 1 may be for a conventional planter or the row unit 200 may be for a central fill planter, in which case the hoppers 208 may be replaced with one or more mini-hoppers and the frame 204 modified accordingly as would be recognized by those of skill in the art.

The downforce control system 214 is configured to apply lift and/or downforce on the row unit 200 such as disclosed in U.S. Publication No. US2014/0090585, which is incorporated herein in its entirety by reference.

The seed trench opening assembly 220 may include a pair of opening discs 222 rotatably supported by a downwardly extending shank member 205 of the frame 204. The opening discs 222 may be arranged to diverge outwardly and rearwardly so as to open a v-shaped trench 10 in the soil 11 as the planter traverses the field. The seed delivery mechanism 212, such as a seed tube or seed conveyor, may be positioned between the opening discs 222 to deliver seed from the seed meter 210 into the opened seed trench 10. The depth of the seed trench 10 may be controlled by a pair of gauge wheels 224 positioned adjacent to the opening discs 222. The gauge wheels 224 may be rotatably supported by gauge wheel arms 226 which are pivotally secured at one end to the frame 204 about pivot pin 228. A rocker arm 230 may be pivotally supported on the frame 204 by a pivot pin 232. In such an embodiment, it should be appreciated that rotation of the rocker arm 230 about the pivot pin 232 sets the depth of the trench 10 by limiting the upward travel of the gauge wheel arms 226 (and thus the gauge wheels) relative to the opening discs 222. The rocker arm 230 may be adjustably positioned via a linear actuator 234 mounted to the row unit frame 204 and may be pivotally coupled to an upper end of the rocker arm 230. The linear actuator 234 may be controlled remotely or automatically actuated as disclosed, for example, in International Publication No. WO2014/186810, which is incorporated herein in its entirety by reference.

A downforce sensor 238 may be configured to generate a signal related to the amount of force imposed by the gauge wheels 224 on the soil. In some embodiments the pivot pin 232 for the rocker arm 230 may comprise the downforce sensor 238, such as the instrumented pins disclosed in U.S. Pat. No. 8,561,472, which is incorporated herein in its entirety by reference.

The seed meter 210 may be any commercially available seed meter, such as a finger-type seed meter or vacuum-type seed meter as are well-known in the art. One example of a suitable vacuum-type seed meter is the VSet® meter, available from Precision Planting LLC, 23207 Townline Rd, Tremont, Ill. 61568.

The trench closing assembly 250 may include a closing wheel arm 252 pivotally attached to the row unit frame 204. A pair of offset closing wheels 254 may be rotatably attached to the closing wheel arm 252 and angularly disposed to "close" the seed trench 10 by pushing the walls of the open seed trench back together over the deposited seed 12. An actuator 256 may be pivotally attached at one end to the closing wheel arm 252 and at its other end to the row unit frame 204 to vary the down pressure exerted by the closing wheels 254 depending on soil conditions. The closing wheel assembly 250 may be of the type disclosed in International Publication No. WO2014/066650, which is incorporated herein in its entirety by reference.

The packer wheel assembly 260 may comprise an arm 262 pivotally attached to the row unit fame 204 and extending rearward of the closing wheel assembly 250 and in alignment therewith. The arm 262 may rotatably supports a packer wheel 264. An actuator 266 may be pivotally attached at one end to the arm 262 and at its other end to the row unit frame 204 to vary the amount of downforce exerted by the packer wheel 264 to pack the soil over the seed trench 10.

The row cleaner assembly 270 may be any commercially available row cleaner assembly. One example of a suitable row cleaner assembly is the CleanSweep® system available from Precision Planting LLC, 23207 Townline Rd, Tremont, Ill. 61568. The row cleaner assembly 270 may include an arm 272 pivotally attached to the forward end of the row unit frame 204 and aligned with the trench opening assembly 220. A pair of row cleaner wheels 274 may be rotatably attached to the forward end of the arm 272. An actuator 276 may be pivotally attached at one end to the arm 272 and at its other end to the row unit frame 204 to adjust the downforce on the arm to vary the aggressiveness of the action of the row cleaning wheels 274 depending on the amount of crop residue and soil conditions.

Figure 37:
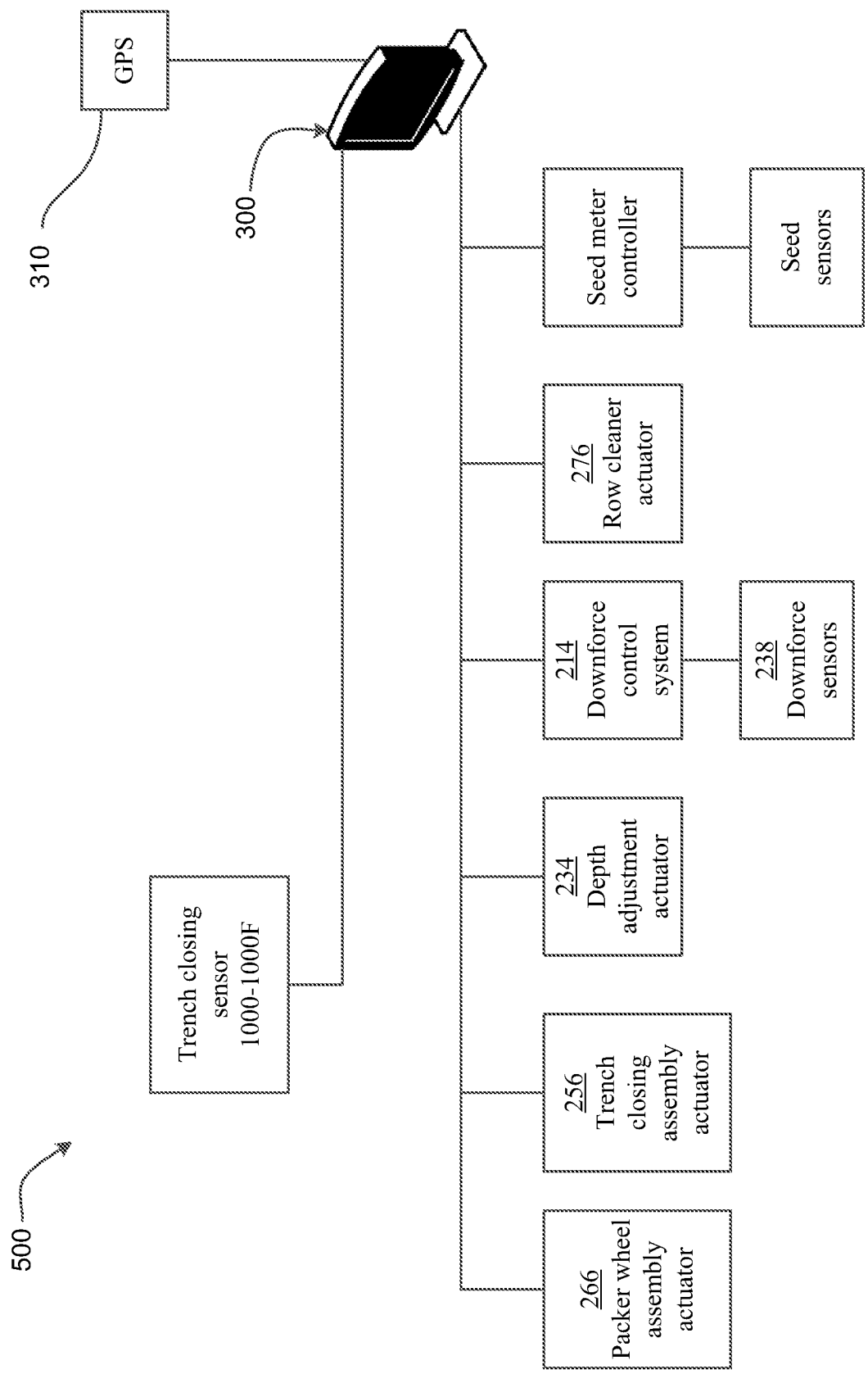
FIG. 37 is a diagram of a system for implementing operational control of the closing wheel assembly and packer wheel assembly based on signals generated by the trench closing sensors.
Figure 38:
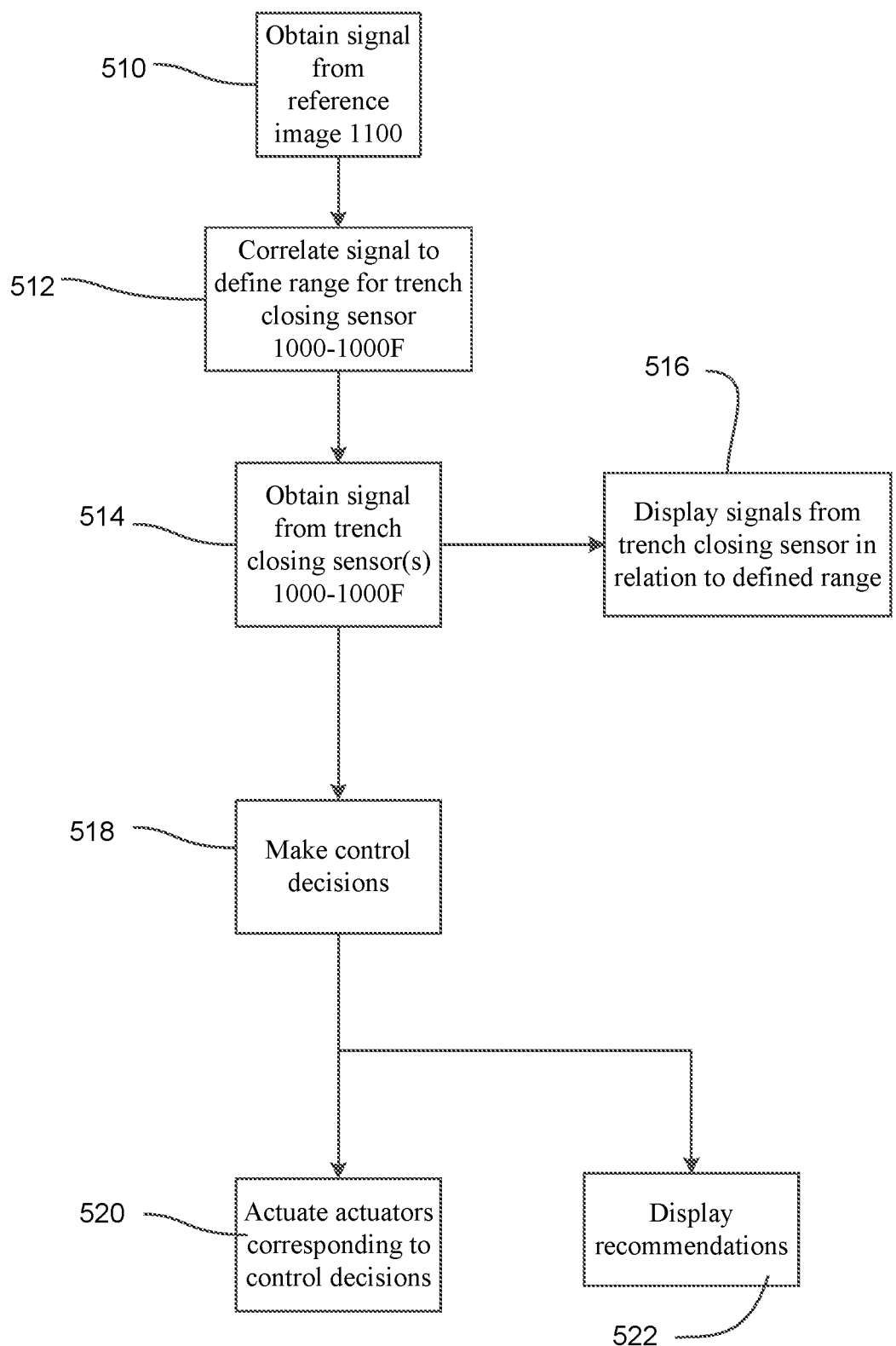
FIG. 38 is a flow chart illustrating an embodiment for implementing operational control and operator feedback based on the references sensor and trench closing sensor.

Referring to FIGS. 37 and 38, a monitor 300 is visible to an operator within the cab of a tractor pulling the planter. The monitor 300 may be in signal communication with a GPS unit 310, the trench closing assembly actuator 256 and the packer wheel assembly actuator 266 to enable operational control of the trench closing assembly 250 and the packer wheel assembly 260 based on the signals generated by the trench closing sensors 1000 (as discussed later). Also, as discussed later, the monitor 300 may be programmed to display operational recommendations based on the signals generated by the trench closing sensors 1000. The monitor 300 may also be in signal communication with the row cleaner actuator 276, the depth adjustment actuator 234, the downforce control system 214 and the trench opening assembly 230, respectively.

The various embodiments of trench closing sensors and other sensors as described herein may be used to verify whether good seed-to-soil contact is being achieved during planting operations and may be used to enable automatic or remote adjustment of the planter while on-the-go.

I. In-Trench Sensors

A. Drag Wire Pull Sensors

Figure 2:
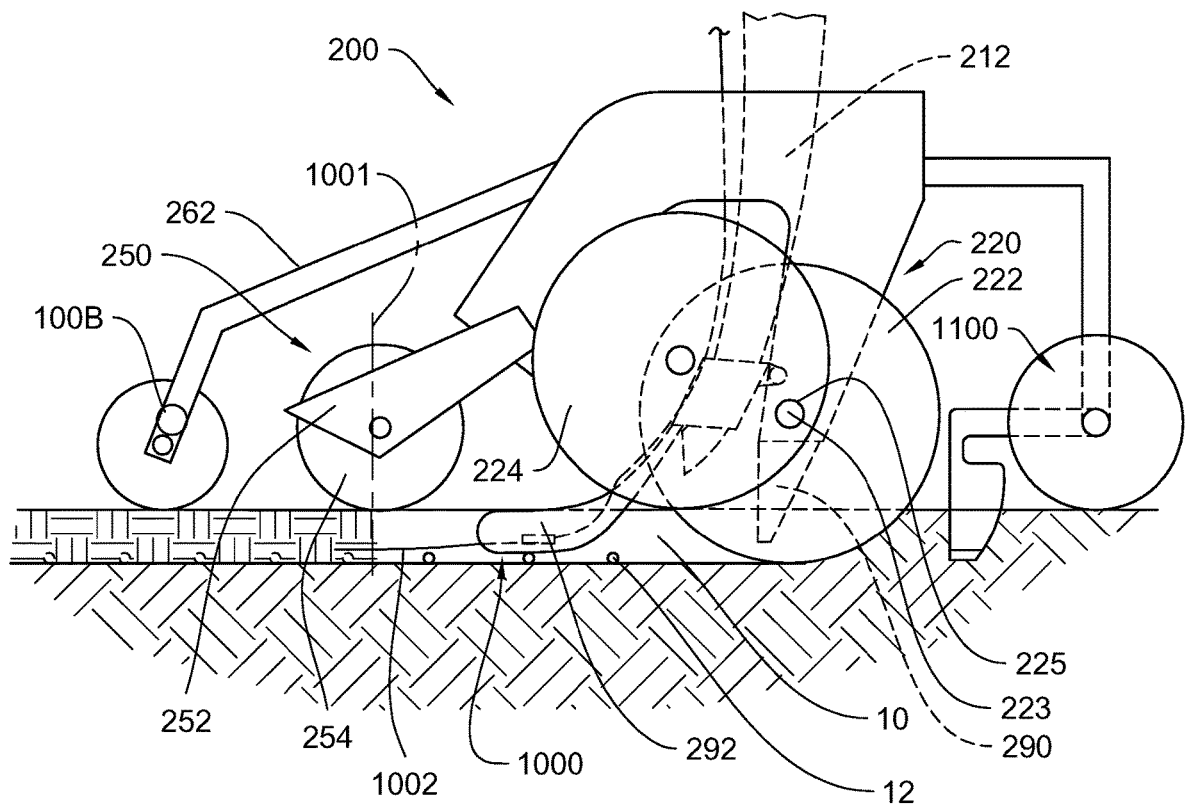
FIG. 2 illustrates an embodiment of a trench closing sensor and a reference sensor disposed on a planter row unit.

FIG. 2 illustrates one embodiment of a trench closing sensor 1000 to determine if the closing wheel assembly 250 is sufficiently closing the open seed trench 10 with soil and/or to determine the amount of compaction of the soil over the seed within the seed trench 10. The trench closing sensor 1000 comprises wire, string or other suitable elongate member (hereinafter referred to as the "drag wire" 1002) disposed to drag in the seed trench 10. Generally, as the open seed trench 10 and drag wire 1002 are covered with soil by the closing wheel assembly 250 during planting operations, the trench closing sensor 1000 measures or detects whether the seed trench is being adequately closed with soil by measuring the amount of force required to pull the wire 1002 through the soil or by measuring the amount of strain, pulling force or tension in the drag wire or by measuring the amount of soil pressure acting on the drag wire 1002.

To adequately measure or detect if the seed trench is being adequately closed with soil, the end of the drag wire 1002 may terminate proximate to the vertical axis 1001 extending through the center of the closing wheel 254 of the closing wheel assembly 250 of the row unit 200 or several inches rearward of the vertical axis 1001.

The drag wire 1002 may be supported by any suitable structure that permits the rearward end of the drag wire 1002 to drag within the seed trench 10. For example, the drag wire 1002 may be supported from the seed tube 212, the seed tube guard 290, the shank 205, or from another appurtenance 292 aligned with the seed trench such as a seed firmer. An example of a commercially available seed firmer is a Keeton® seed firmer available from Precision Planting, LLC, 23207 Townline Rd, Tremont, Ill. 61568. Another commercially available appurtenance 292 which aligns with the seed trench is a FurrowJet™, also available from Precision Planting, LLC.

Figure 3:
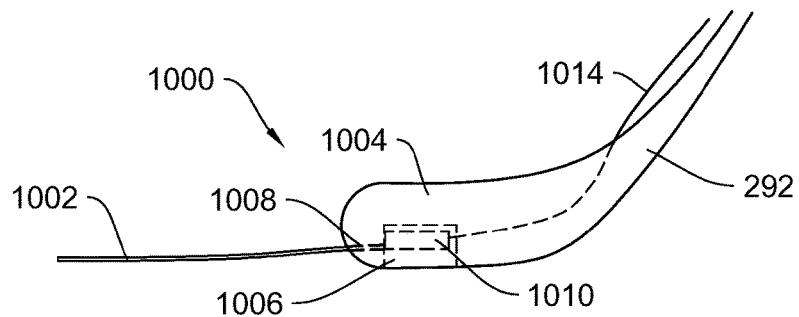
FIG. 3 is an embodiment of seed firmer adapted to function as trench closing sensor showing the drag wire coupled to an instrument disposed in the body of the seed firmer.

FIG. 3 is an enlarged view of trench closing sensor 1000 shown in FIG. 2. In this embodiment, a cavity 1006 is formed in the plastic body 1004 of the seed firmer appurtenance 292. The rearward end of the drag wire 1002 extends outwardly from the rear of the body 1004 through an aperture 1008. The forwarded end of the drag wire 1002 may be coupled to an instrument 1010 (such strain gauge, a hall effect sensor or a potentiometer) disposed within the cavity 1006. The signals generated by the instrument 1010, are communicated to the monitor 300 by signal wires 1014.

In use, as the row unit 200 travels forwardly, the closing wheels 254 of the trench closing assembly 250 close the open seed trench 10 by pushing the walls of the seed trench 10 back together over the deposited seed 12 and the drag wire 1002. As the drag wire 1002 is pulled through the soil of the closed seed trench, the instrument 1010 measures the strain on the drag wire 1002, or the amount of pulling force or tension exerted on the drag wire 1002. It should be appreciated that if the seed trench 10 is optimally closed producing good seed-to-soil contact, the instrument 1010 will measure a greater strain, tension or pulling force than if the seed trench is poorly closed. Likewise, the instrument 1010 can detect if the trench closing assembly 250 is excessively compacting the soil or inadequately packing the soil depending on the strain, tension or pulling force required to pull the drag wire 1002 through the closed trench.

Figure 4:
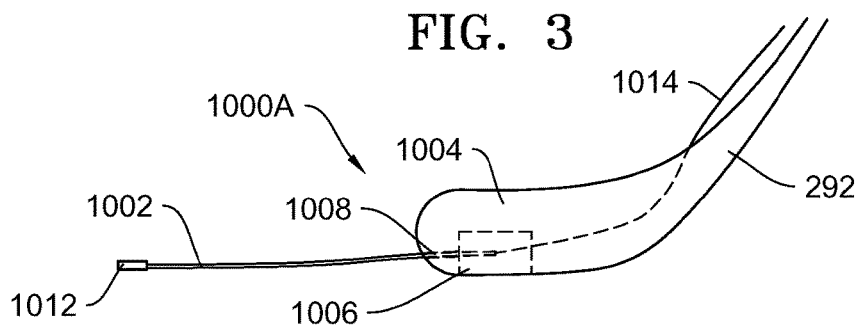
FIG. 4 illustrates an embodiment of a trench closing sensor utilizing a pressure transducer coupled to the rearward end of the drag wire.

FIG. 4 illustrates another embodiment of a trench closing sensor 1000A. In this embodiment, rather than measuring the pulling force or tension in the wire, a pressure transducer 1012, such as a piezoresistive or piezoelectric transducer, is coupled to the rearward end of the drag wire 1002 to measure the pressure being exerted on the transducer 1012 by the surrounding soil pushed into the seed trench 10 by the closing wheel assembly 250. The pressure detected by the transducer 1012 is communicated by signal wires 1014 to the monitor 300. It should be appreciated that the more soil pushed into the seed trench 10 by the closing wheel assembly 250, the more soil covers the transducer 1012 generating a higher pressure measurement. Conversely, if the closing wheel assembly is not pushing a sufficient amount of soil into the seed trench to adequately cover the seed, the transducer 1012 will measure a lower pressure.

Figure 5:
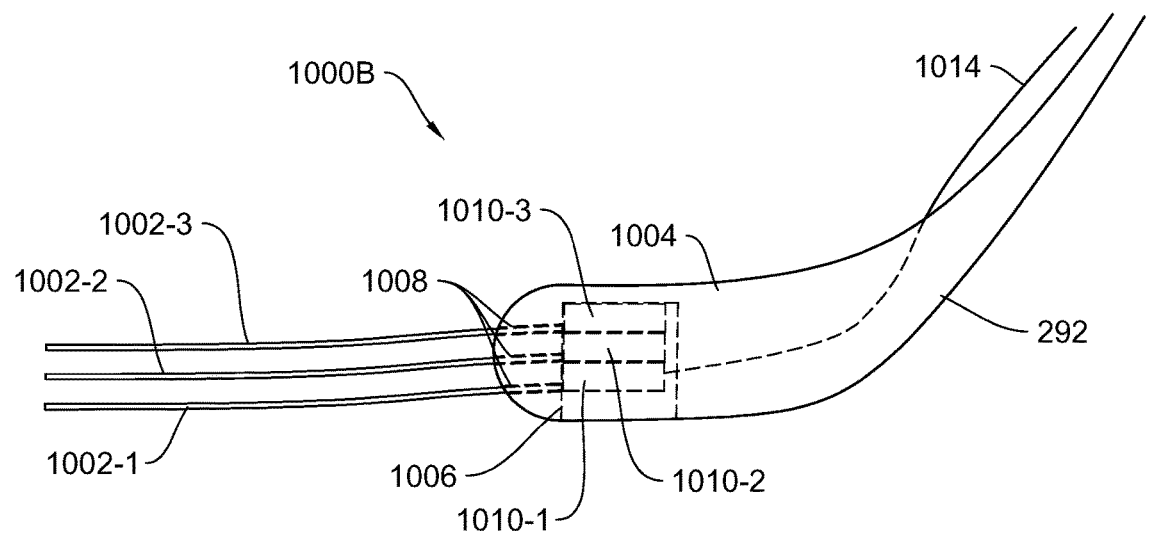
FIG. 5 illustrates an embodiment of a trench closing sensor with vertically stacked drag wires.

FIG. 5 illustrates another embodiment of a trench closing sensor 1000B in which multiple drag wires 1002-1, 1002-2, 1002-3 are stacked vertically, each coupled to a respective instrument 1010-1, 1010-2, 1010-3 (such strain gauge, a hall effect sensor or a potentiometer) disposed within the cavity 1006 so as to provide a profile perspective of the trench closure. It should be appreciated that rather than three drag wires as illustrated in FIG. 4, there may be only two stacked drag wires or more than three stacked drag wires. Additionally, it should be appreciated that each of the stacked the drag wires 1002 may be instrumented with a pressure transducer as described above or one of more of the stacked wires may be instrumented with a pressure transducer while other wires are coupled to an instrument 1010 disposed within the cavity 1006. Each drag wire 1002 may have a different geometry, length or diameter as compared to other drag wires 1002. The different geometries or diameters may provide a different signal response for different areas within the trench. Alternatively, instead of vertical alignment, multiple drag wires 10021, 1002-2, 1002-3 can be stacked horizontally (not shown), or a combination of horizontal and vertical stacks (not shown).

In another embodiment, instrument 1010-1, 1010-2, and 1010-3 may send an electrical current to multiple drag wires 1002-1, 1002-2, and 1002-3, respectively. If any of drag wires 1002-1, 1002-2, or 1002-3 make contact, an electrical circuit will be formed, and instruments 1010-1, 1010-2, and 1010-3 may then determine which drag wires 1002-1, 1002-2, and 1002-3 are in contact with one another. This information may be sent to monitor 300 by signal wire 1014. Knowing whether the multiple drag wires 1002-1, 1002-2, and 1002-3 are touching provides information about whether multiple drag wires 1002-1, 1002-2, and 1002-3 are sensing the same location or different locations. When contacted, multiple drag wires 1002-1, 1002-2, and 1002-3 are measuring the same location and provides another measurement to determine whether the trench is open or closed. For example, if the furrow is open, multiple drag wires 1002-1, 1002-2, and 1002-3 would fall under gravity and contact one another.

Figure 6:
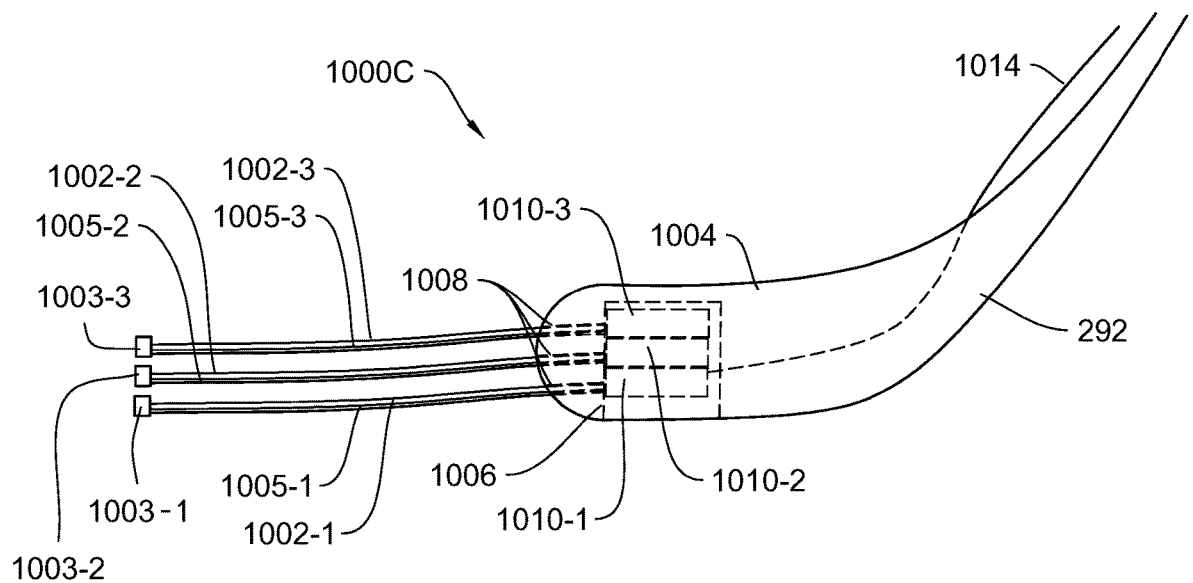
FIG. 6 illustrates an alternative embodiment to that of FIG. 5 by including conductive tips at the end of the drag wires.

FIG. 6, illustrates another embodiment of a trench closing sensor 1000C in which multiple drag wires 1002-1, 1002-2, and 1002-3 comprise non-conductive material with conductive tips 1003-1, 1003-2, and 1003-3 at their rearward ends. In such an embodiment, the conductive tips 1003-1, 1003-2, and 1003-3 are connected to respective instruments 1010-1, 1010-2, and 1010-3, and by respective electrically conductive wires 1005-1, 1005-2, and 1005-3.

Figure 7:
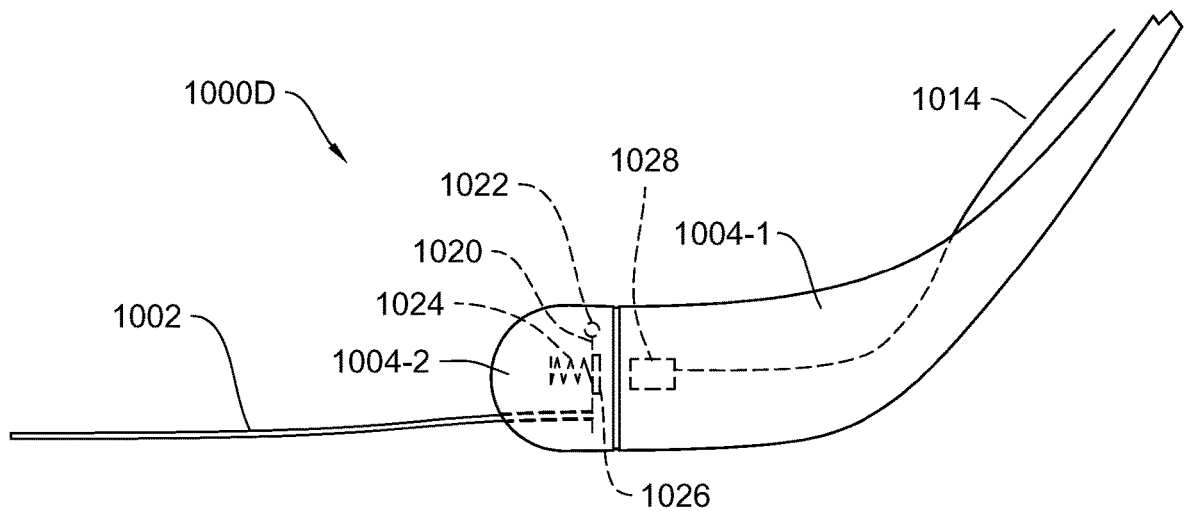
FIG. 7 is a side elevation view of an embodiment of a seed firmer adapted to function as trench closing sensor showing a detachable portion of the seed firmer with the drag wire in the detachable portion.
Figure 13:
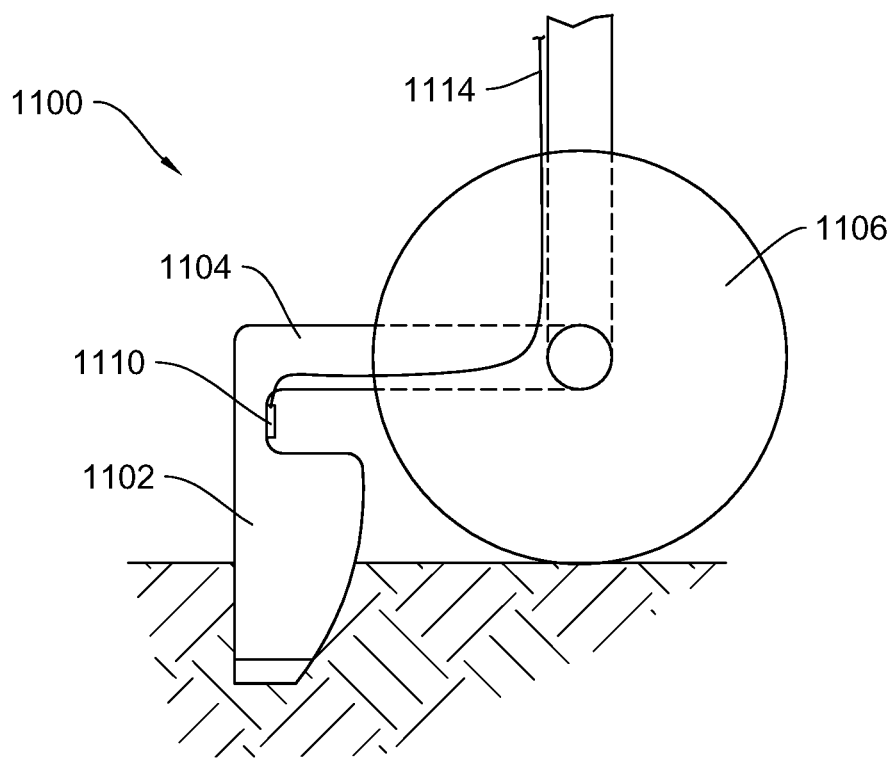

FIG. 7 illustrates another embodiment of a trench closing sensor 1000D. In this embodiment, trench closing sensor 1000 has a first body 1004-1 and a second body 1004-2. The second body 1004-2 may be detachable from the first body 1004-1 by any suitable attachment, such as a fastener, nut and bolt, screw, and/or clip. The second body 1004-2 includes a pivot member 1020 attached at one end to a pivot 1022. The other end of the pivot member 1020 extends downwardly from the pivot 1022 to which is attached the drag wire 1002. The drag wire 1002 extends rearward through second body 1004-2. A biasing element 1024 (such as a spring) biases pivot member 1020 forward towards the first body 1004-1. A stop (not shown) may be provided to prevent movement of the pivot member 1020 too far forward. In a neutral position in one embodiment, the pivot member 1020 is perpendicular to the ground. A transmitter 1026 (such as a magnet) is disposed on the pivot plate 1020. Transmitter 1026 generates a signal (such as a magnetic field) that is detected by a receiver 1028 (such as a Hall Effect sensor) disposed in the first body 1004-1. In one embodiment, the transmitter 1026 may be disposed on the pivot plate 1020 on the side facing the first body 1004-1. The receiver 1028 is in communication with monitor 300 through signal wire 1014. The receiver 1028 may be disposed on a circuit board and then connected to signal wire 1014, such as illustrated in FIG. 13 (discussed later).

In use, as drag wire 1002 is pulled by contact with soil, pivot member 1020 will pivot rearward, and the distance between transmitter 1026 and receiver 1028 will increase and change the signal (magnetic field) measured by receiver 1028. An advantage of this two-piece construction, permits easier replacement of the drag wire 1002 when it becomes worn by simply removing second body 1004-2 and replacing it with a new second body 1004-2.

Figure 8:
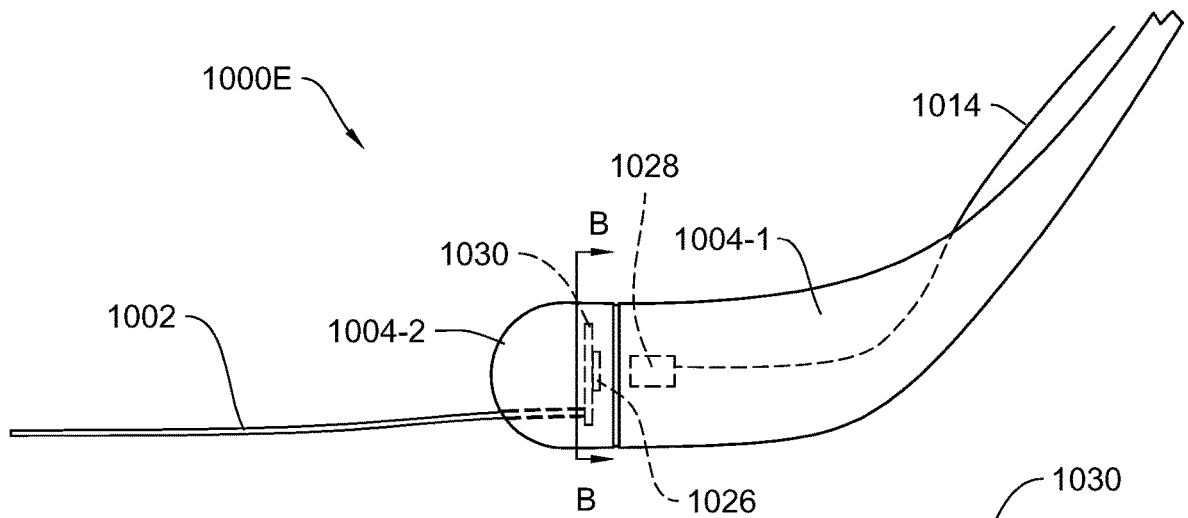
FIG. 8 is a side elevation view of another embodiment of a seed firmer adapted to function as trench closing sensor showing the drag wire in the detachable portion of the seed firmer body.
Figure 8A:
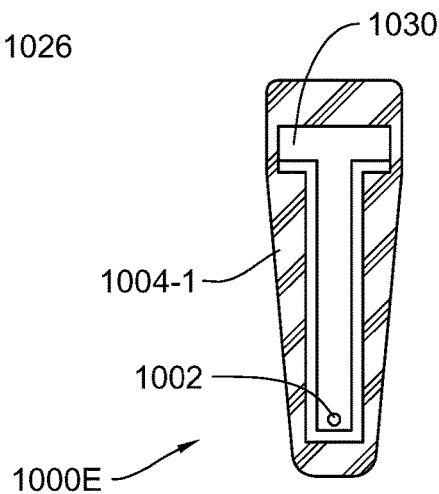
FIG. 8A is a cross-sectional view along lines B-B of FIG. 27A showing an embodiment of a plate disposed in a detachable portion of the seed firmer body.

FIGS. 8 and 8A illustrate another alternative embodiment of a trench closing sensor 1000E. The embodiment of the trench closing sensor 1000E is similar to the embodiment of the trench closing sensor 1000D except that a resilient plate 1030 replaces pivot member 1020 and pivot 1022. The transmitter 1026 is disposed on resilient plate 1030. In use, as drag wire 1002 is pulled by contact with soil, the resilient plate 1030 deflects, and returns to its original position when no force is applied. As illustrated in FIG. 8A, resilient plate 1030 may have a T shape. It should be appreciated that the pivot member 1020 and pivot 1022 (referenced in the trench closing sensor embodiment 1000D) may be utilized in place of the resilient plate 1030.

Figure 9:
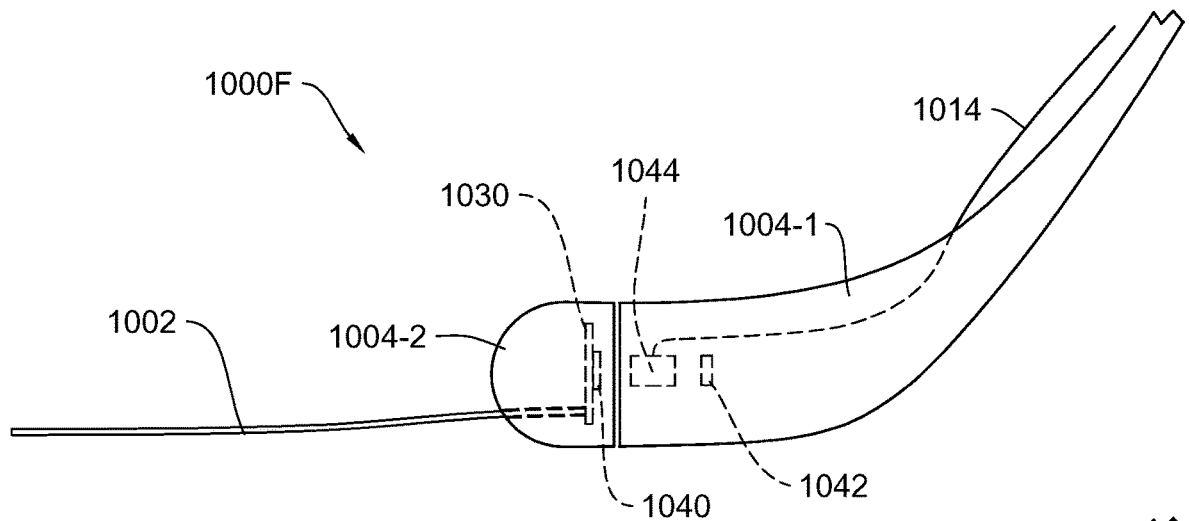
FIG. 9 is a side elevation view of another embodiment of a seed firmer adapted to function as trench closing sensor showing a Hall Effect sensor between two magnets.

FIG. 9 illustrates another embodiment of a trench closing sensor 1000F. The embodiment of the trench closing sensor 1000F is similar to the embodiment of the trench closing sensor 1000E except that the transmitter 1026 attached to the resilient plate 1030 in the second body 1004-2 is replaced by a first magnet 1040 and the receiver 1028 is replaced by a second magnet 1042 and Hall Effect sensor 1044 in the first body 1004-1. The first and second magnets 1040, 1042 are arranged so that the same poles (both N-N or S-S) are oriented towards each other. Hall Effect sensor 1044 is disposed equidistant from first magnet 1040 and second magnet 1042 so that the field measured at this middle point is zero. The benefit of having this configuration is that the full voltage range for the Hall Effect sensor 1044 is available to measure the magnetic field in the compressed space as compared to only having half of the voltage range available to read the magnetic field at a distance from to infinity. It should be appreciated that the pivot member 1020 and pivot 1022 (referenced in the trench closing sensor embodiment 1000D) may be utilized in place of the resilient plate 1030.

Depending on the strength of the Hall Effect sensor (1028, 1044, or 1010), measuring a small amount of drag can be affected by the earth's magnetic field and the direction of travel. Orientation of the Hall Effect sensor (1028, 1044, or 1010) in relation to the earth's magnetic field may cause the Hall Effect sensor (1028, 1044, or 1010) to measure a larger or smaller force. To compensate, a reference sensor 1101 to measure the earth's magnetic field without the force being measured by Hall Effect sensor (1028, 1044, or 1010) may be disposed on the row unit 200 as shown in in FIG. 1, or, alternatively, the reference sensor 1101 may be disposed on the toolbar 202 or other component of the agricultural implement (not shown). The reference sensor 1101 may be a Hall Effect sensor, a magnetometer, a compass, or any instrument that measures a magnetic field. The measurement from Hall Effect sensor (1028, 1044, or 1010) may be compared to the reference sensor 1101 to determine the actual force measured by Hall Effect sensor (1028, 1044, or 1010). Alternatively, rather than actually measuring the earth's magnetic field, the reference sensor 1101 may derive the earth's magnetic field from the position of the agricultural implement from the GPS location and direction of travel, such as with GPS 310. The earth's magnetic field may be referenced from a database based on the position and direction of travel of the implement.

It should also be appreciated that any of the embodiments of the trench closing sensors 1000-1000F may be comprised of a single body 1004 (as shown in FIGS. 3-6) or the two-piece bodies 1004-1, 1004-2 as shown in FIGS. 7-9.

Figure 10:
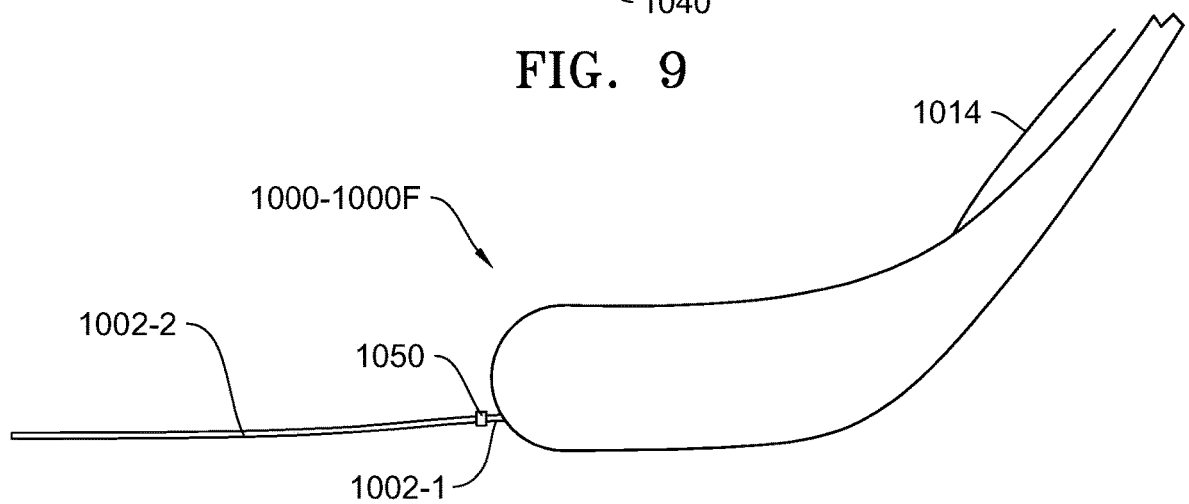
FIG. 10 is a side elevation view of a seed firmer adapted to function as trench closing sensor showing a detachable drag wire.

Additionally, as shown in FIG. 10, any of the drag wires 1002 described herein may be made in two parts, wherein a drag wire base section 10021 and a replaceable drag wire 1002-2 are connected at a detachable connection 1050 which allows for easier replacement of the drag wire should it become worn.

Figure 11:
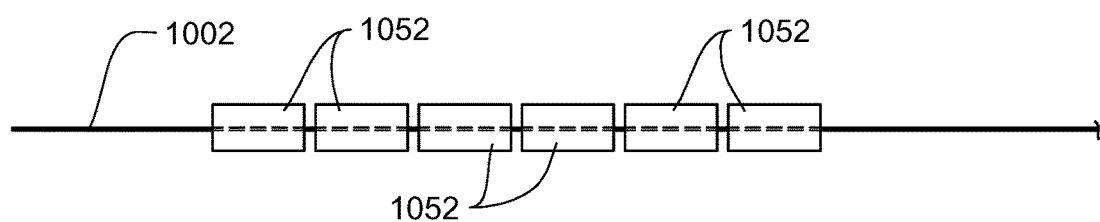
FIG. 11 shows an embodiment of a drag wire with a plurality of wear protectors disposed over the drag wire.

Referring to FIG. 11 the drag wire 1002 utilized in any of the embodiments of the trench closing sensors 1000-1000f may be provided with a wear protector 1052 made from any material that increases wear resistance compared to the material of drag wire 1002. In one embodiment, the wear protector 1052 is made from tungsten carbide. However, because tungsten carbide can be brittle, the wear protector is applied in a plurality of pieces along the length of the drag wire 1002. It should be appreciated however, that the wear protector 1052 may be a single continuous piece instead of a plurality of individual wear protection pieces as shown in FIG. 11. Whether as a single piece or as a plurality of pieces, wear protector 1052 may cover from greater than 0 up to 100% of the drag wire 1002 or the percentage of coverage with the wear protector 1052 of the drag wire 1002 extending from body of the firmer may be 40 to 60%, about 50%, greater than 90%, or 95-99%.

Figure 12:
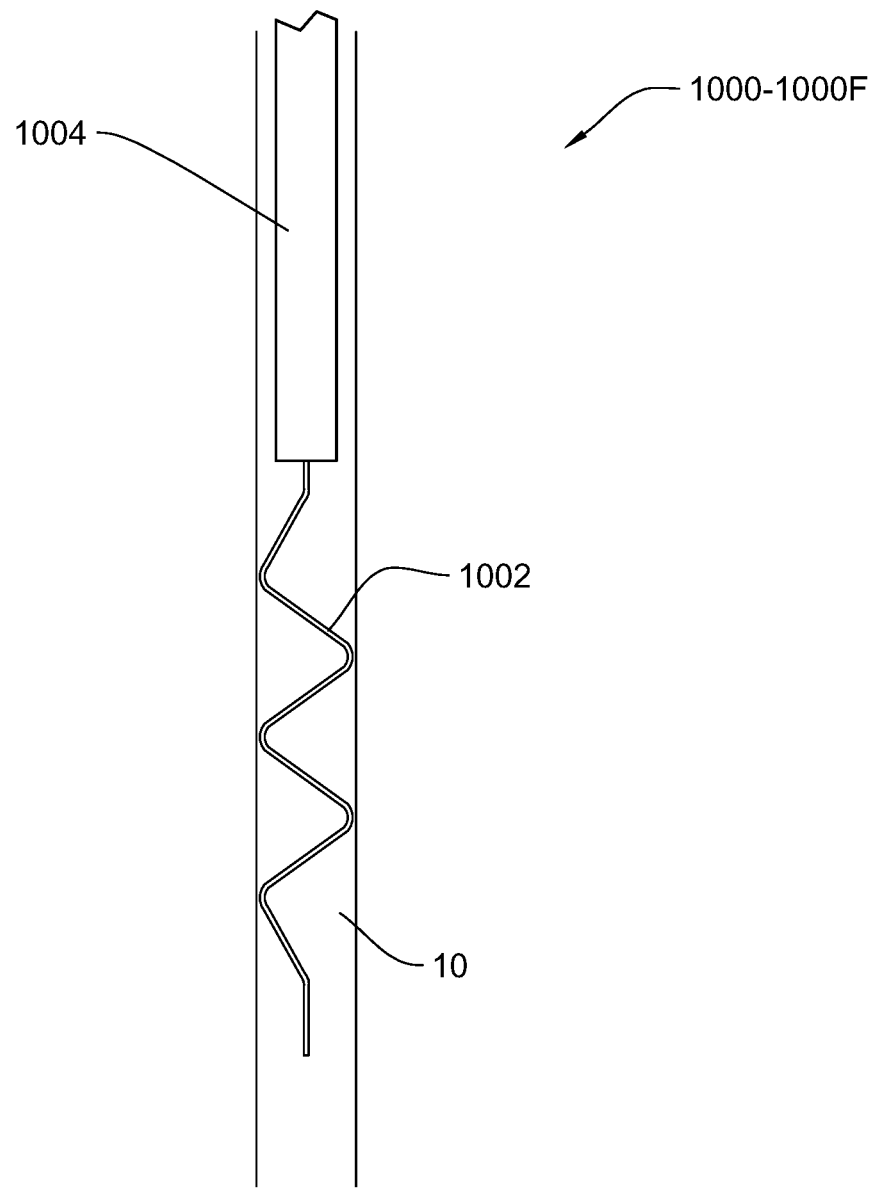
FIG. 12 is a top plan view of a trench sensor with a bent or serpentine drag wire.

In still another embodiment as shown in FIG. 12, which is applicable to all the embodiments of the trench closing sensors 1000-1000F previously described, rather than drag wire 1002 being straight, the drag wire 1002 may instead be bent or curved in a serpentine configuration extending from sidewall to sidewall of the trench 10. In such an embodiment, the serpentine wire 1002 may be instrumented with a bend sensor such that as the trench is closed over the serpentine drag wire, causing the drag wire to straighten out as the wire is pulled through the soil, a more accurate measurement may be obtained than with a straight wire. Additionally, rather than a serpentine wire, the wire may be in the form of a coil (not shown) to detect forces acting in all three dimensions.

Figure 14:
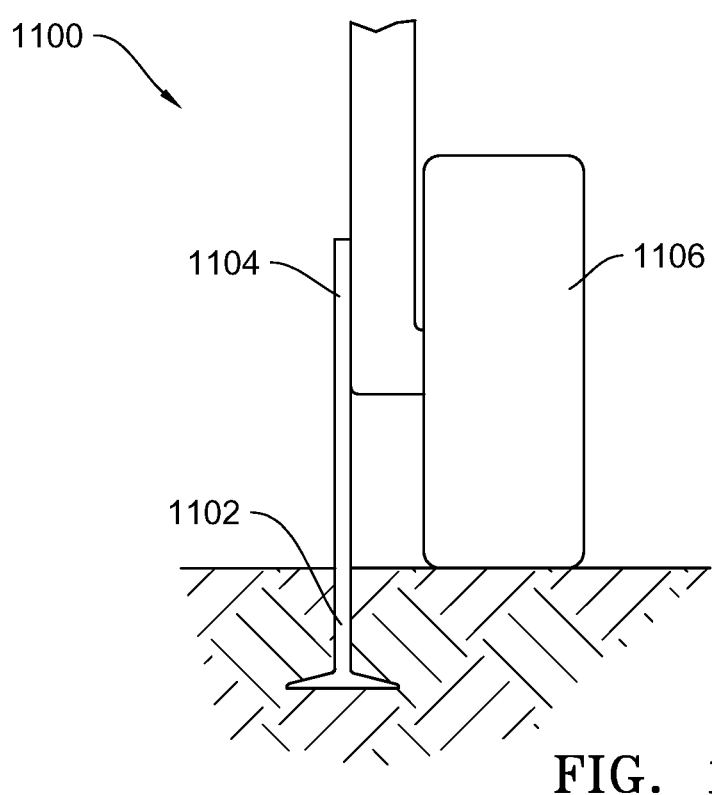
FIG. 14 is an enlarged side elevation view of an embodiment of a reference sensor.

A reference sensor 1100 (FIGS. 2, 13 and 14) may be provided to "calibrate" the trench closing sensors 1000-1000F to account for conditions that may have an effect on the drag coefficient properties of the soil, including such factors as planter speed, trench depth, soil texture, soil moisture and soil density. As best illustrated in FIGS. 13 and 14, the reference sensor 1100 includes a drag member 1102 which is disposed to drag through the soil outside of the seed trench 10. The reference sensor 1100 may be disposed forward of the trench opening assembly 220 as shown in FIG. 2 or the drag member 1102 may be mounted between the row units 200 (not shown). The drag member 1102 is supported by an arm 1104 which is adjustably positionable with respect to a gauge wheel 1106 to vary the penetration depth of the drag member 1102 with respect to the soil surface. The arm 1104 is instrumented with a strain gauge 1110 to detect the strain exerted on the arm 1104 as the drag member 1102 drags through the soil. Signal wires 1114 transmit the electrical resistance change in the strain gauge 1110 to the monitor 300. The monitor 300 is programmed to correlate the electrical resistance change to detected strain in the arm 1104 which can then be correlated with the signals generated by the drag wire sensor 1000-1000F to define the range of the force, tension or pressure that the trench closing sensors 1000-1000F should be detecting if the seed trench is being adequately closed by the trench closing assembly 250.

In other embodiments, the reference sensor 1100 may be the penetration force of row unit 200. The penetration force may be measured directly with force sensor 223, such as a strain gauge, disposed at the opener disc spindle 225 as illustrated in FIG. 2. The penetration force of row unit 200 may also be determined by subtracting the gauge wheel force measured by downforce sensor 238 from the applied force as applied by the downforce control system 214 and the mass of row unit 200.

In other embodiments, the reference sensor 1100 may be the electrical conductivity or reflectance of the soil measured using the electrical conductivity sensors 370 and reflectance sensors 350 as described in connection with FIG. 18 discussed below.

In another embodiment, the reference sensor 1100 may be the geospatial soil type information based on GPS location, such as the USDA SSURGO data, which may be useful when changing zones in the field. The data for each zone in the field can be the reference.

Figure 15:
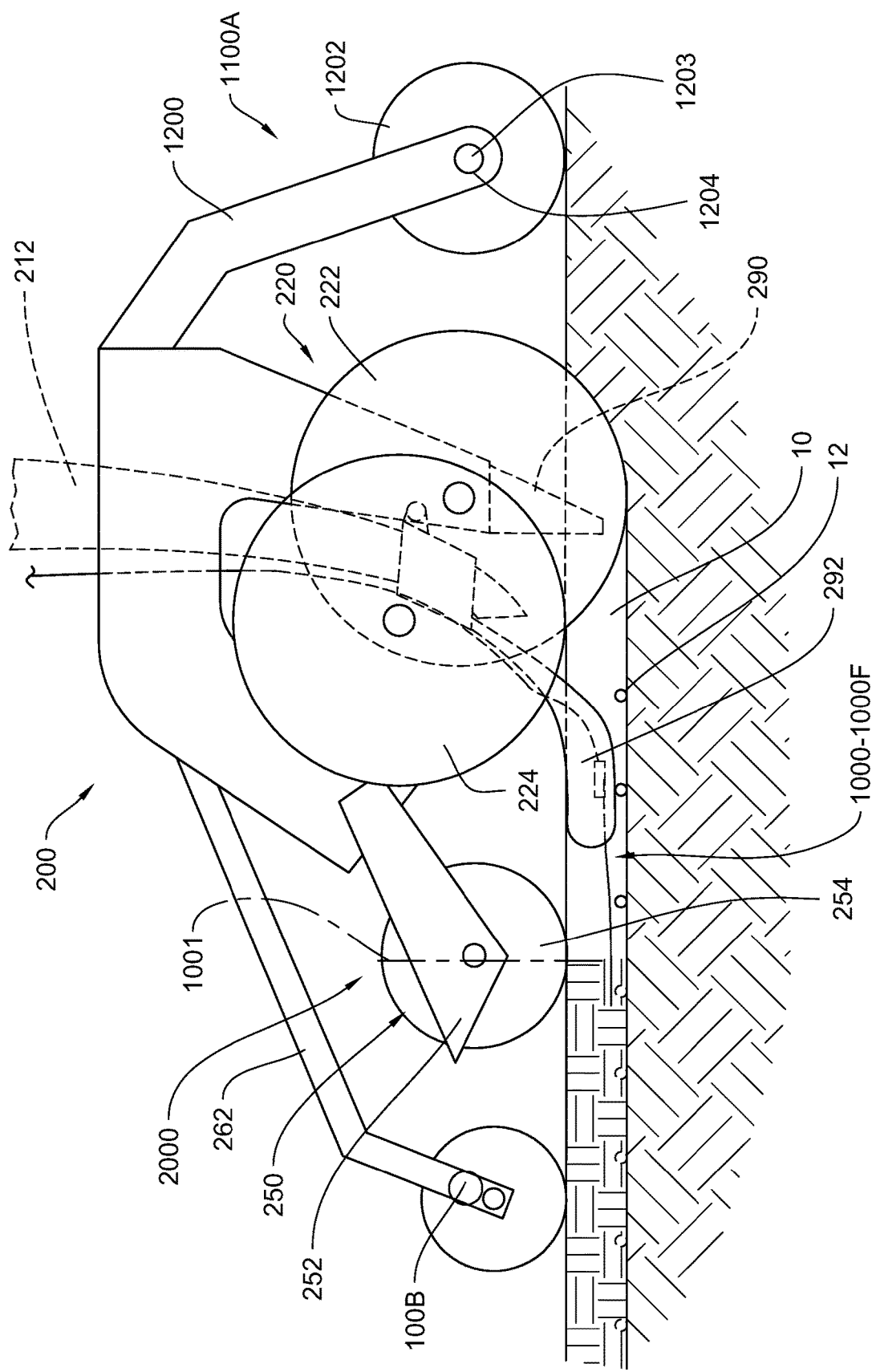
FIG. 15 is a rear elevation view of the reference sensor of FIG. 6.

An alternative reference sensor 1100A, illustrated in FIG. 15, includes a coulter arm 1200 attached to row unit 200 with a coulter 1202 attached to coulter arm 1200 with axle 1203. At axle 1203, a force sensor 1204, such as downforce sensor 238, measures the force that coulter 1202 transmits to axle 1203. Force sensor 1204 is in data communication with monitor 300.

Figure 16:
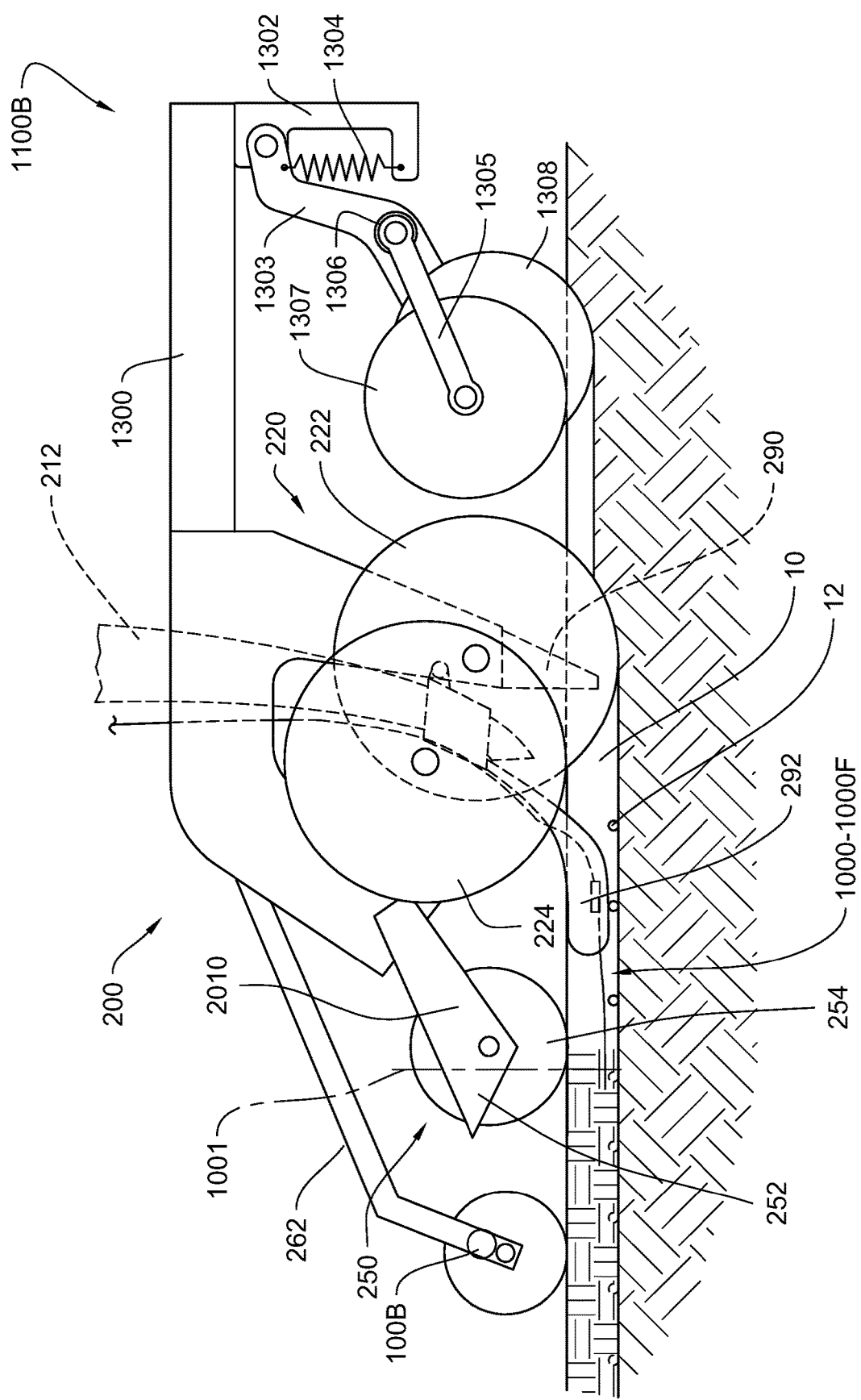
FIG. 16 illustrates an alternative reference sensor.

An alternative reference sensor 1100B, illustrated in FIG. 16, includes arm 1300 mounted to row unit 200 (or alternatively to toolbar 202), and at the opposite end of arm 1300 is bracket 1302. A coulter arm 1303 is pivotably mounted to bracket 1302, and a force device 1304, such as a spring, is disposed to connect coulter arm 1303 to bracket 1302 to apply a fixed force to coulter arm 1303. Alternatively, the force device may be a pneumatic device, hydraulic device, an electromechanical device, or an electro-hydraulic device. A coulter 1308 is rollingly mounted to coulter arm 1303. A gauge wheel arm 1305 is pivotably connected to coulter arm 1303, and a gauge wheel 1307 is rollingly mounted to gauge wheel arm 1305. An angle sensor 1306 is disposed at the pivoting connection between gauge wheel arm 1305 and coulter arm 1303. Examples of angle sensor 1306 include, but are not limited to, a rotary potentiometer or Hall-effect sensor. Angle sensor 1306 is in data communication with monitor 300. In this embodiment, force device 1304 applies a known force to coulter 1308. As the hardness of the soil changes, gauge wheel arm 1305 will rotate, and angle sensor 1306 measures the amount of rotation.

Another reference sensor that may be used in conjunction with drag wire sensor 1000-1000F is the speed of row unit 200. As the speed of travel changes, the force, tension or pressure measured will directly change with the change in speed. The speed of row unit 200 may be determined by any suitable device, such as a speedometer on the tractor (tractor wheel speed), GPS distance change over time, or ground speed radar. Any of these devices may be in data communication with monitor 300.

B. Pressure Sensing (1) Fluid Tube Drag Wires

In yet another alternative embodiment, any the embodiments of the trench closing sensors 1000-1000F may utilize a fluid tube drag wire instead of metal, string or other material. In such an embodiment, the fluid tube drag wire 1002 may be filled with a fluid (gas or liquid) and connected to pressure sensor instrument 1010, but with all other features of the prior embodiments 1000-1000F remaining the same. In use, as soil covers the fluid tube drag wire 1002, the fluid tube will compress causing an increase in the pressure in fluid tube which is measured by the pressure sensor instrument 1010. In one embodiment, the fluid tube drag wire 1002 is not elongatable longitudinally (i.e., fore to aft in line with the direction of travel) so that any pressure change that would be caused by elongation is minimized or eliminated. In such an embodiment, the fluid tube may have a rigid side that does not elongate. In one embodiment, at least 20% or at least 25% of the circumference/perimeter of fluid tube drag wire 1002 is rigid and the remainder is compressible. In cross-section, the fluid tube drag wire 1002 may be circular or it may be square or polygonal in shape and may have one, two, or three rigid sides.

(2) Pressure Sensing Drums

Figure 17:
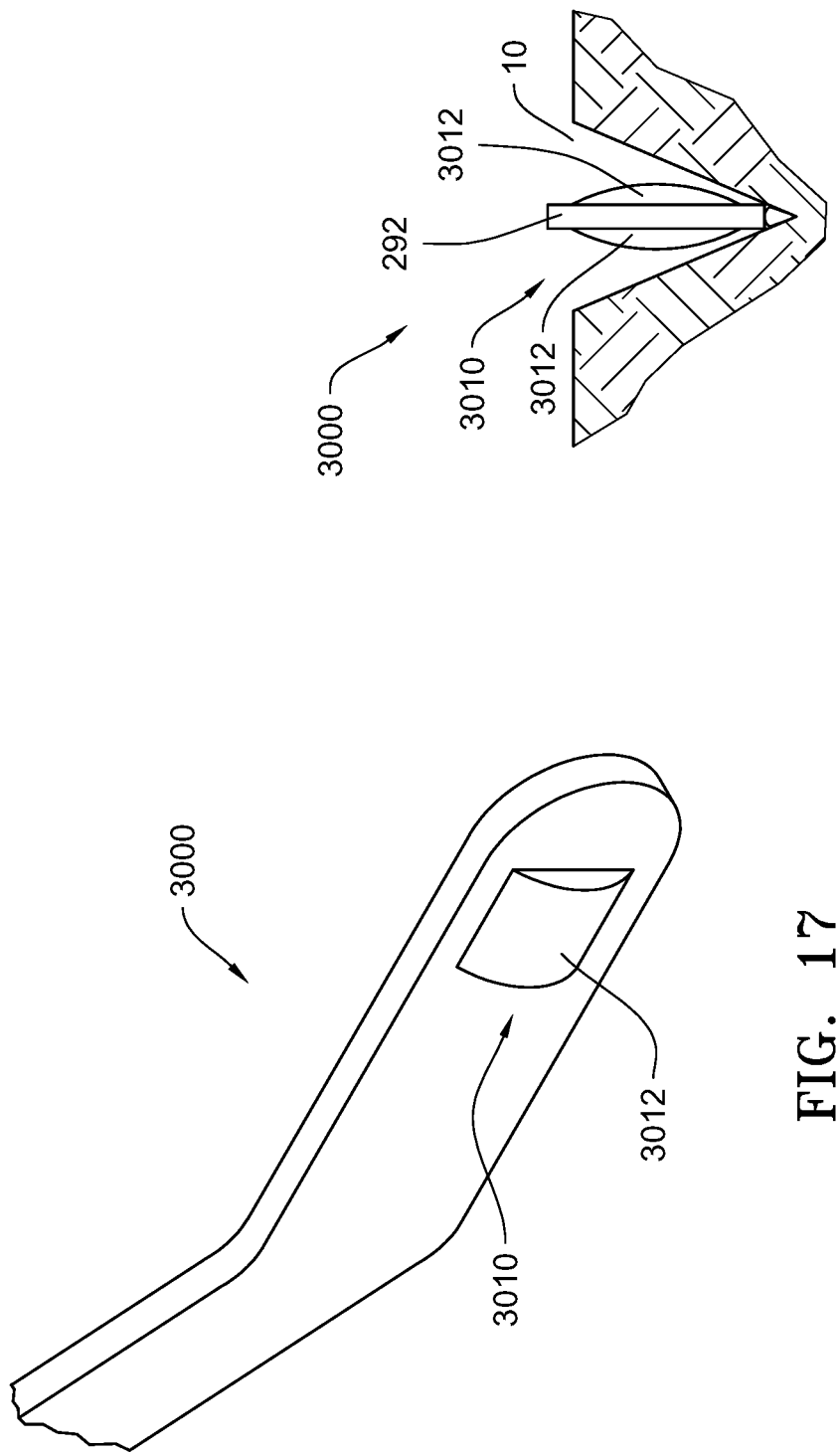
FIG. 17 illustrates an alternative reference sensor.

FIGS. 17 and 17A illustrate an embodiment of a trench closing sensor 3000 wherein the seed firmer appurtenance 292 includes a pressure sensing drum 3010 secured within the body of the firmer which results in outwardly bulging drum heads 3012 as best viewed from the front elevation view of FIG. 17A. The drum heads 3012 may move together or independently. A pressure transducer (not shown) may be disposed within the drum 3010 to measure the pressure exerted against the drum heads 3012 by the soil as the soil is pushed into the trench 10 by the closing wheels 254 of the closing wheel assembly 250. It should be appreciated that if the trench 10 is optimally closed producing good seed-to-soil contact, the pressure sensing drum 3010 will measure a greater pressure than if the seed trench is poorly closed. Likewise, the pressure sensing drum 3010 may detect if the trench closing assembly 250 is excessively compacting the soil or inadequately packing the soil depending on the measured pressure or the measured reactive force of the soil being pinned together by the closing wheels. Additionally, the pressure sensing drum 3010 may sense the closing wheel penetration into the soil, from which the trench closure can be inferred. It should be appreciated that in such an embodiment, the firmer 292 may need to be elongated so the firmer body extends further rearwardly toward the closing wheels than a conventional Keeton® firmer (as referenced above) such that the drum 3010 is positioned to measure the pressure exerted by the soil where the closing wheels 254 are closing the trench 10. The pressure sensing drum 3010 may be incorporated into any of the embodiments of the trench closing sensors 1000-1000F described above.

C. Soil Characteristic Sensing

Figure 18:
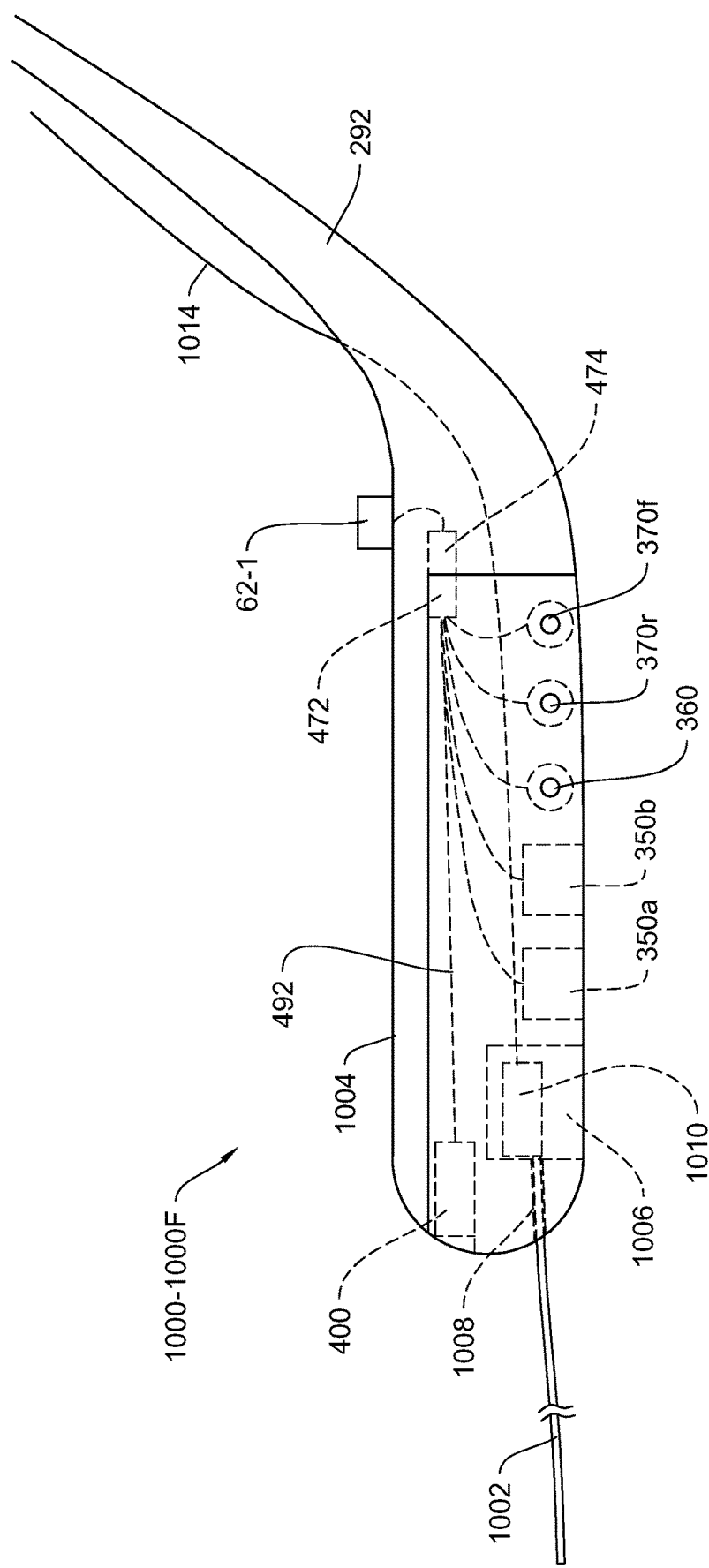
FIG. 18 is an embodiment of seed firmer adapted to function as trench closing sensor showing the drag wire coupled to an instrument disposed in the body of the seed firmer and having a plurality of firmer-mounted sensors.

FIG. 18 illustrates an embodiment wherein any of the previously described embodiments of the trench closing sensors 1000-1000F incorporate other sensors disposed along the body 1004 of the firmer. These other sensors may include reflectivity sensors 350*a* and 350*b*, a temperature sensor 360 and electrical conductivity sensors 370*f* and 370*r* such as disclosed in International Publication No. WO2015/171908 incorporated herein by reference. These other sensors 350, 360, 370 are shown as being in data communication with monitor 300 via a wireless transmitter 62-1. A male and female coupler 472, 474 may be provided which enables a detachable portion 492 of the firmer body containing the sensors and instrumentation to be detached from the main body 1004 of the firmer appurtenance 292. A camera 400 oriented within the firmer to be rearward facing may also be disposed in the firmer.

Figure 19A:
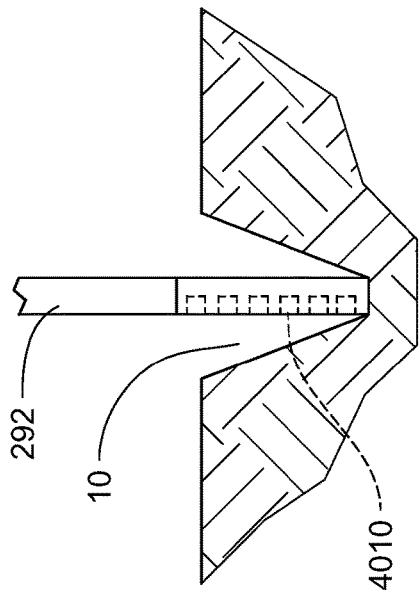
FIG. 19-19A is an embodiment of seed firmer adapted to function as trench closing sensor showing a drum pressure sensor.
Figure 19:
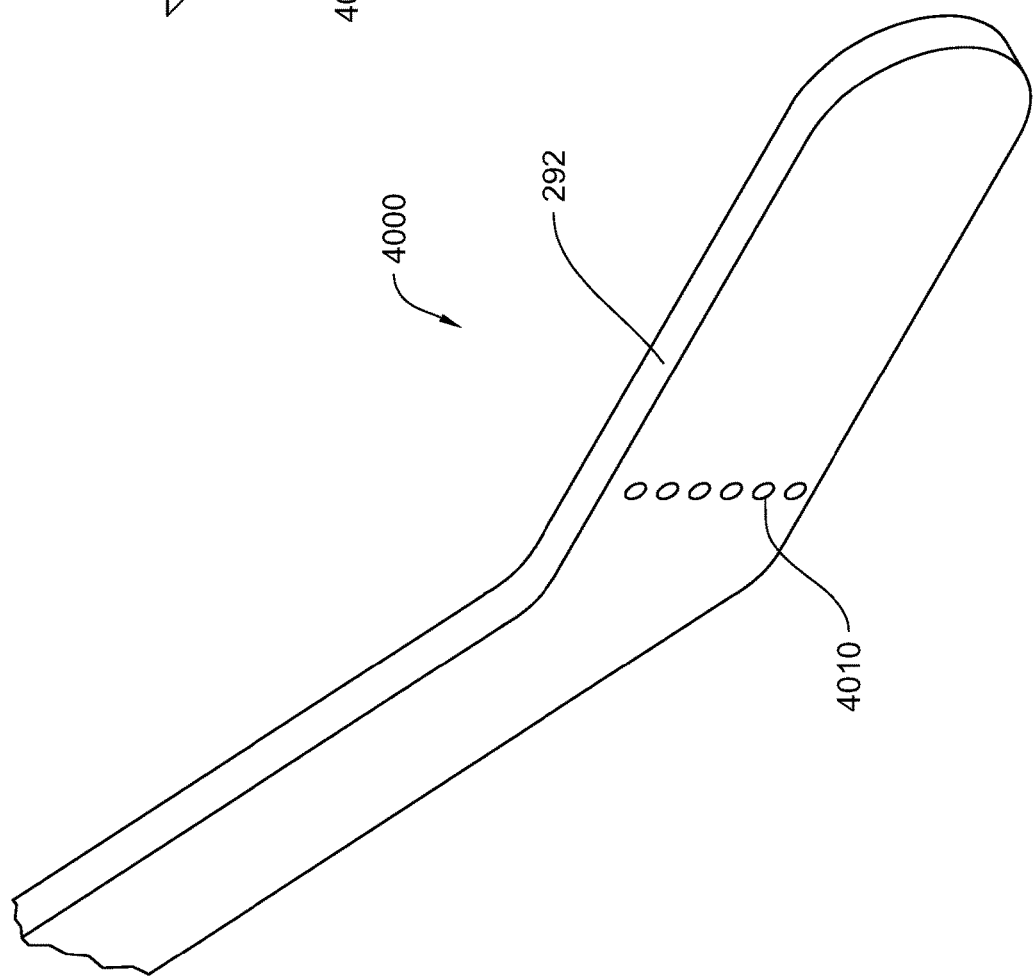

FIGS. 19-19A illustrate another embodiment of a trench sensor 4000 in which the seed firmer appurtenance 292 includes sensors 4010 disposed in a vertical relationship on the body 1004 of the firmer. The sensors 4010 may be any of the above referenced sensors and the vertically oriented sensors 4010 may be incorporated into any of the previously described drag wire trench closing sensors 1000-1000F.

(1) Sensing Trench Sidewall Smoothness or Knitting

The smoothness of the trench sidewall or the detecting of fractured sidewalls or knitting is predictive of the risk of the trench opening back up after it has been closed by the closing wheels. The following sensors can be used to detect the smoothness of the sidewalls: GPR disposed at an angle to a vertical cross-section of the sidewall; LIDAR; time of flight camera; a mini-penetrometer; or electrical conductivity sensors. Additionally the camera 400 may provide visual indication of sidewall fracturing or knitting.

(2) Sensing Trench Soil Density

The density of the soil within the trench can affect the depth of seed embedding. The soil density may be determined by electrical conductivity or inductance sensors 370 disposed in the firmer body 1004 as shown in FIG. 18. Alternatively, soil density may be determined using a GPR and common midpoint ("CMP") analysis.

(3) Sensing Trench Soil Moisture

The moisture of the soil may be detected with electrical conductive sensors 370 disposed in the firmer as shown in FIG. 18. Alternatively, an instrument 1010 may be coupled to the drag wire 1002 adapted to function as an electrical conductivity sensor to detect the soil moisture at the seed level as the drag wire is dragged through the trench.

(4) Sensing Trench Dry Dirt Ingress

The ingress of dry dirt into the soil trench may be detected by electrical conductivity or inductance sensors in the drag wires 1002 as previously described. Alternatively, dry dirt ingress may be detected visually by the camera 400 and the color of the soil.

(5) Sensing Electrical Conductivity

Figure 20:
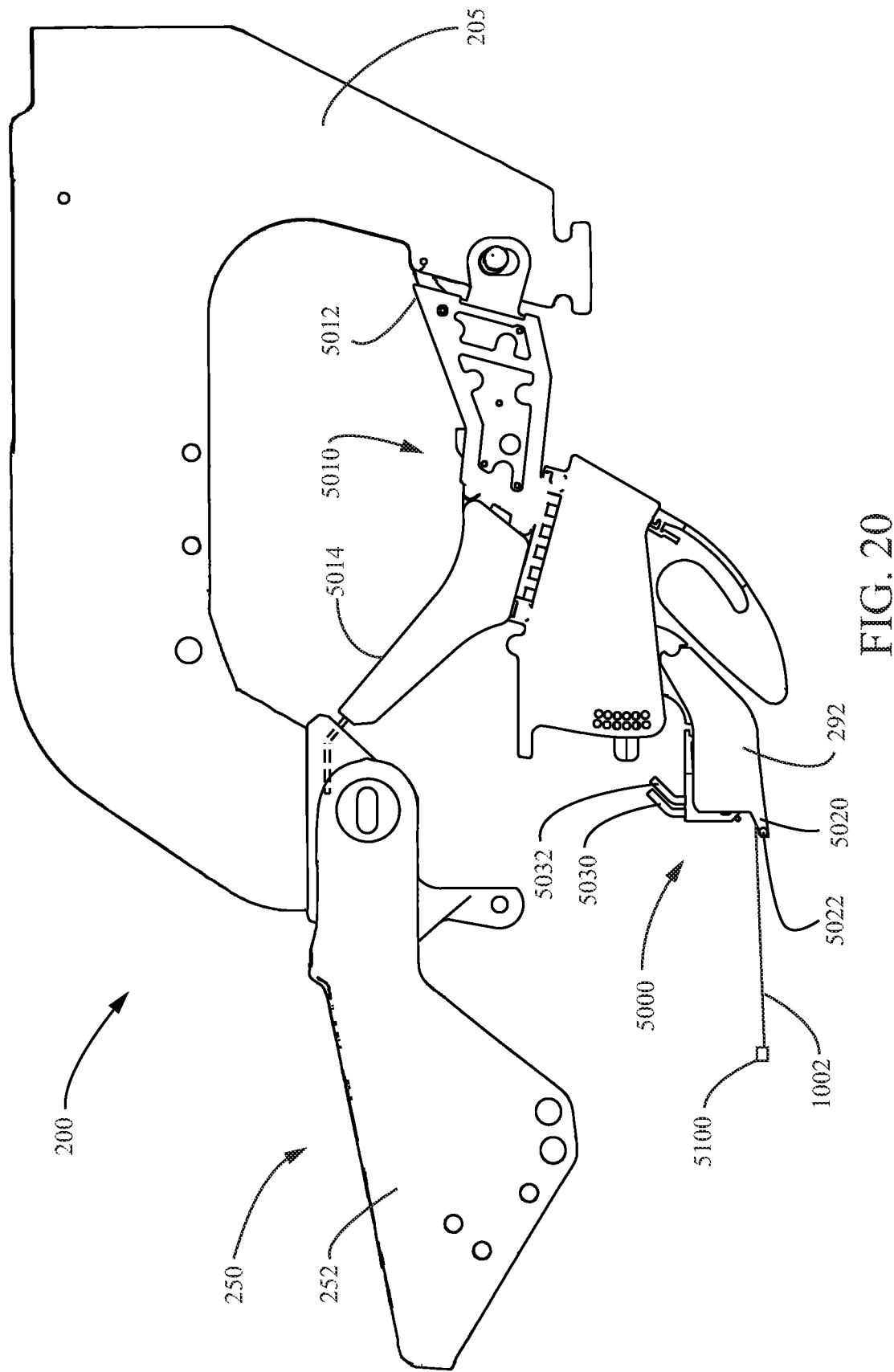
FIG. 20 is an embodiment of an appurtenance adapted to sense electrical conductivity in a seed trench.
Figure 21:
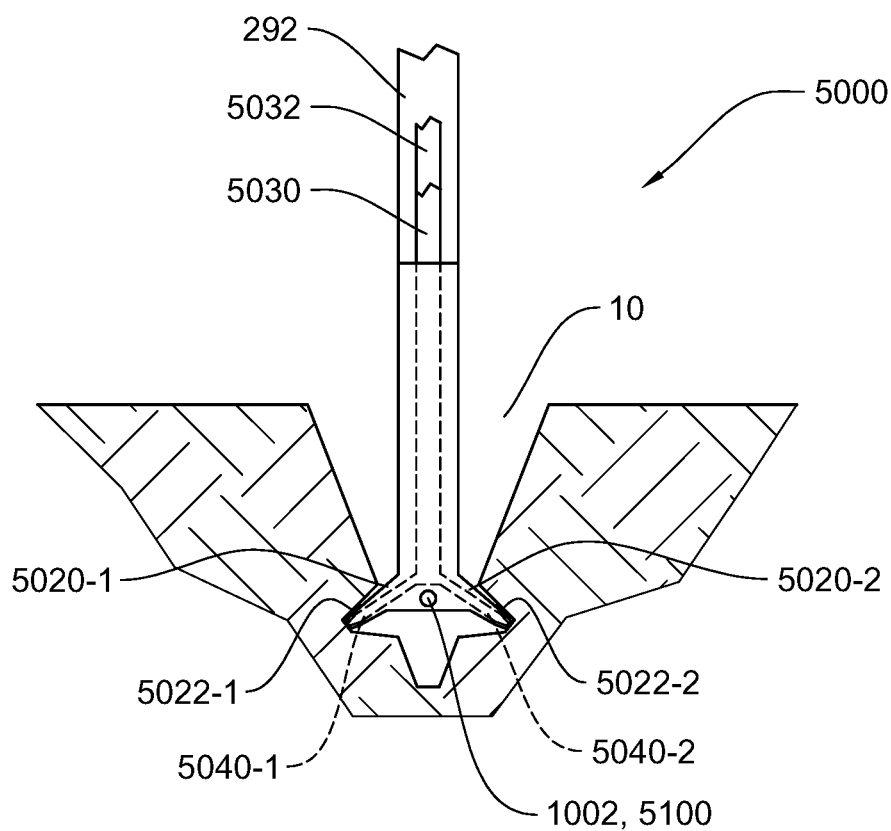
FIG. 21 is a rear elevation view of the appurtenance of FIG. 20 disposed in a seed trench.

FIGS. 20-21 illustrates another embodiment of a trench sensor 5000 adapted for sensing electrical conductivity in which the appurtenance 292 is shown as a FurrowJet™ as previously referenced and as disclosed in International Publication No. WO2016/205424, previously incorporated herein by reference in its entirety. Although trench sensor 5000 is shown as being embodied in a FurrowJet™, it should be appreciated that any appurtenance, including a Keeton® seed firmer as previously referenced, may be utilized for the trench sensor 5000. In FIG. 20, the trench sensor 5000 comprises an appurtenance 292 mounted to the row unit 200 via a bracket 5010, that may include a forward bracket 5012 and a rearward bracket 5014. The appurtenance 292, includes outwardly diverging wing members 5020-1, 5020-2 each having an electrical conductor sensor 5022-1, 5022-2. The appurtenance 292 also includes an instrumented drag wire 1002 with an electrical conductivity sensor 5100. The appurtenance 292 may include one or more liquid placement tubes 5030, 5032 in communication with a liquid product source (not shown). Liquid injection needles 5040-1, 5040-2 (FIG. 21) may extend through respective wing members 5020-1, 5020-2 for injecting liquid product communicated via the liquid tubes 5030, 5032 into the respective sidewalls of the trench (see FIG. 21). The electrical conductivity in the trench sidewall as measured by electrical conductivity sensor 5022-1, 5022-2 is measured and compared to the electrical conductivity of the closed trench measured by electrical conductivity sensor 5100 disposed on the drag wire 1002. By measuring at approximately the same depth and at approximately the same location, the closing of the trench may be more accurately measured. To further improve measurement, the left and right trench walls may be measured by electrical conductivity sensor 5022-1, 5022-2 to provide a right and left reading that is used as a reference to the reading taken by the drag wire electrical conductivity sensor 5100. In one embodiment, electrical conductivity sensors 5022-1 and 5022-2 may be insulated from wing member 5020-1, 5020-2, respectively, by an insulator (not shown) disposed between the electrical conductivity sensors 5022-1, 5022-2 and wing members 5020-1, 5020-2, respectively, allowing for a more direct reading of the trench sidewalls without having to account for electrical conductivity generated by fluids (such as salt solutions) flowing through injection needles 5040-1, 5040-2.

D. Sensing Alignment and Seed Kicking

Figure 22:
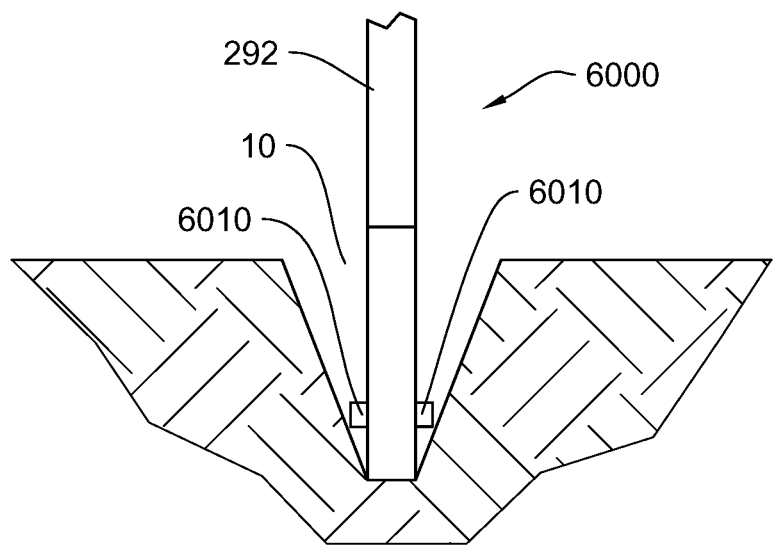
FIG. 22 is an embodiment of a seed firmer adapted to function as a trench sensor showing alignment probes.

FIG. 22 is an embodiment of a trench sensor 6000 with opposing electric probes 6010 disposed on opposing sides of the firmer body which may be used for detecting alignment of the firmer within the trench. In such an embodiment, the electric probes may provide the operator with binary feedback (e.g., yes/no contact with the sidewall) or feedback indicating the load being applied by the sidewall against the electric probe, wherein a large load on one side of the firmer will indicate if the firmer is out of alignment with the center of the seed trench. The electrical probes 6010 may be incorporated into any of the previously described drag wire trench closing sensors 1000-1000F.

Alternatively, the camera 400 providing a rearward-looking view of the seed trench, may provide the operator with a visual indication of the furrow geometry and alignment of the firmer 292 within the bottom of the trench. Additionally, if spiked wheels are being used for the closing wheels 254, the camera may provide visual indication if the spike wheels are undesirably kicking the seeds from the bottom of the seed trench, requiring adjustment of the spike wheels.

E. Other Closing Sensors

In another embodiment, camera 400 can view the area behind trench closing sensors 1000-1000F to view the amount of closing behind trench closing sensors 1000-1000F and under trench closing assembly 250 in the trench. The image can be displayed on the monitor 300.

Figure 39:
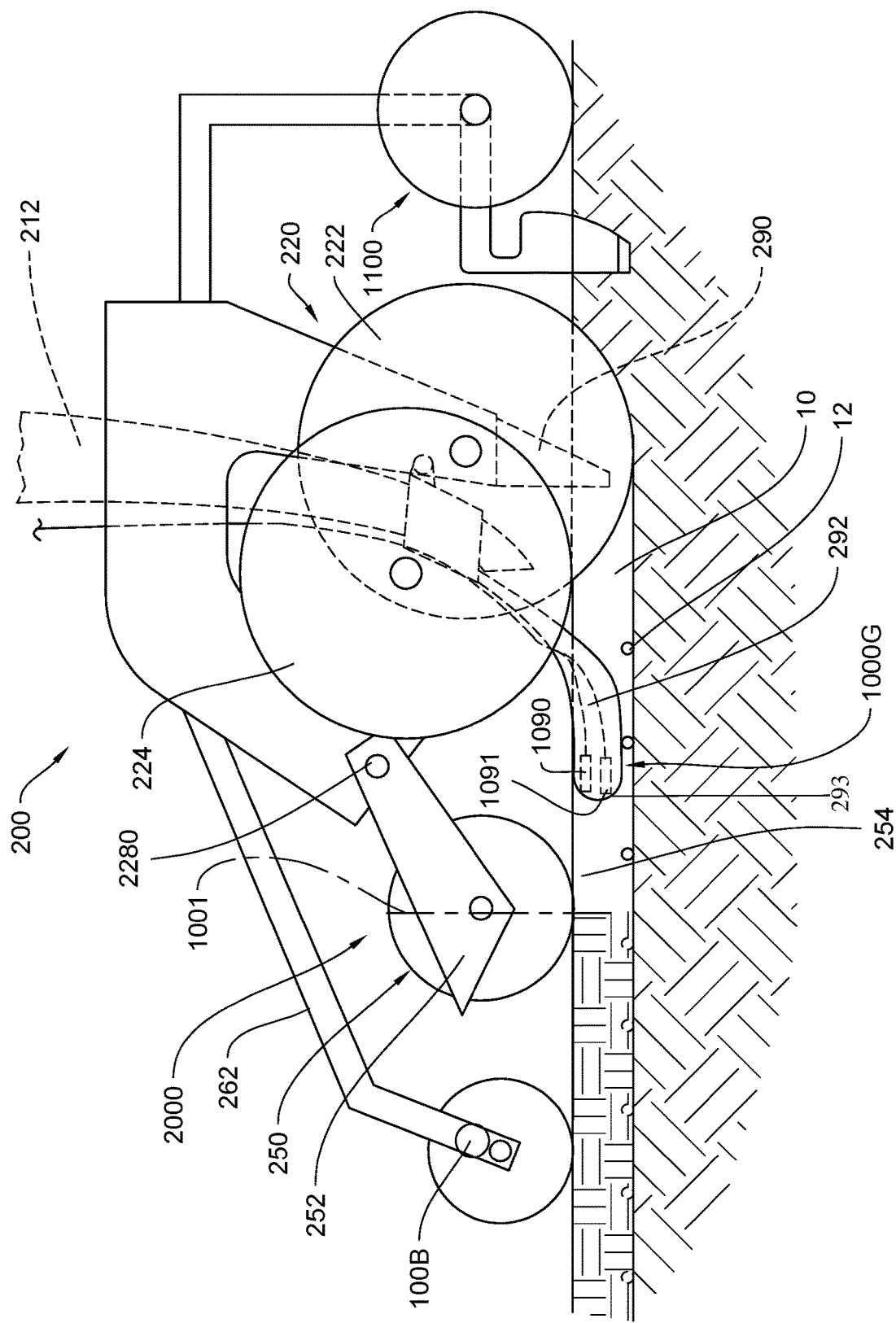
FIG. 39 illustrates an embodiment of a trench closing sensor.

In another embodiment illustrated in FIG. 39, an appurtenance 292 can include a trench closing sensor 1000G disposed at end 293 of appurtenance 292 to sense the trench behind appurtenance 292 and under trench closing assembly 250 in the trench. Trench closing sensor 1000G includes a transmitter 1090 and a receiver 1091. While shown with the transmitter 1090 disposed over receiver 1091, receiver 1091 can be disposed over transmitter 1090. Alternatively, transmitter 1090 and receiver 1091 can be a single transceiver. Trench closing sensor 1000G can be light/reflectivity, radar, sonar, ultrasonic, or LIDAR. For radar, sonar, ultrasonic, or LIDAR, a distance from appurtenance 292 to the closed portion of the trench is measured. Knowing the position of trench closing assembly 250 relative to appurtenance 292, there is an expected distance that the trench should be closed. If the measured distance is different from the expected distance, an alarm can be displayed on monitor 300 and/or a deviation to the distance can be associated with the georeferenced coordinates obtained from GPS, and the deviation can be mapped. As an example, if the distance is as expected, the location can be displayed as green, and if the distance is not as expected, the location can be displayed as red.

II. Other Out-of-Trench Sensors

A. Work Layer Imaging

Referring to FIG. 2, work layer sensors 100, such as disclosed in PCT Application No. PCT/US2016/031201, which is incorporated herein in its entirety by reference may be disposed on row unit 200 to generate a signal or image representative of the soil densities or other soil characteristics throughout a soil region of interest, hereinafter referred to as the "work layer" 104. Work layer sensors 100 may determine the effectiveness of the closing of the trench to identify if there are any void spaces in the closed trench or changes in soil density. The work layer sensors may be used in conjunction with the trench closing sensor 1000-1000F.

Figure 23:
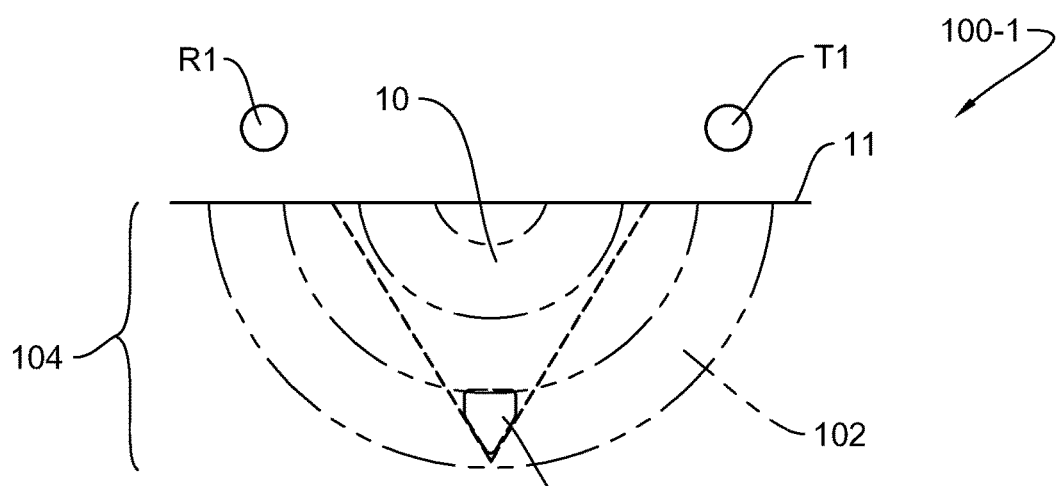
FIG. 23 schematically illustrates one embodiment of a work layer sensor, in elevation view, disposed in relation a seed trench.
Figure 25:
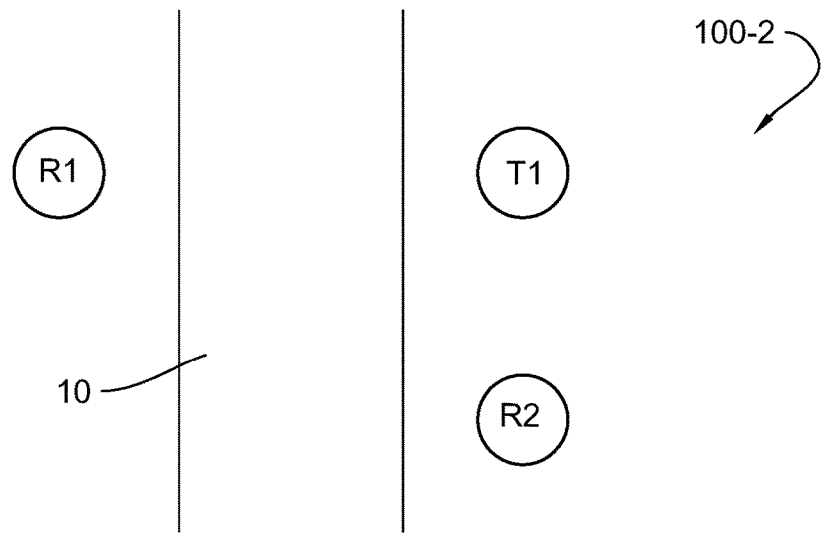
FIG. 25 schematically illustrates another embodiment of a work layer sensor, in plan view, disposed in relation to a seed trench.
Figure 27:
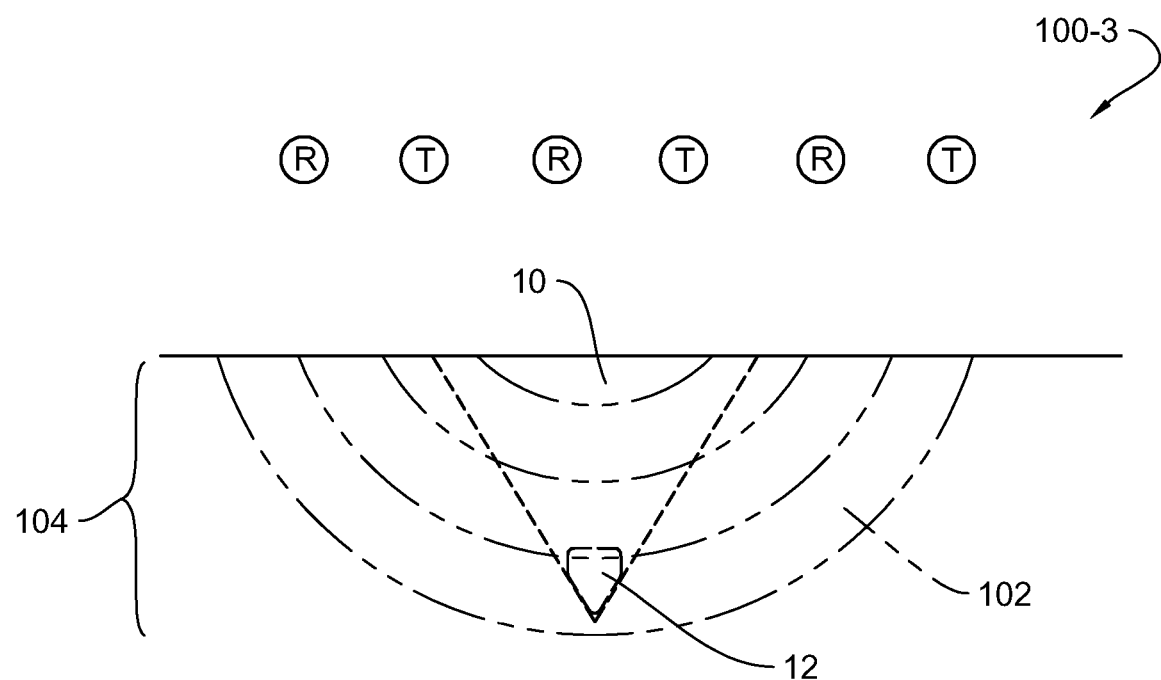
FIG. 27 schematically illustrates another embodiment of a work layer sensor, in elevation view, disposed in relation to a seed trench.

FIGS. 23, 25 and 27 schematically illustrate alternative embodiments of a work layer sensor 100. The representative image or signal generated by the work layer sensor 100 is hereinafter referred to as the "work layer image" 110. In one particular application discussed later, the work layer sensors 100 may be mounted to a planter row unit 200 (FIG. 1) for generating a work layer image 110 of the seed trench as the planter traverses the field. The work layer image 110 may be displayed on a monitor 300 visible to an operator within the cab of a tractor and the planter may be equipped with various actuators for controlling the planter based on the characteristics of the work layer 104 as determined from the work layer image 110.

The work layer sensor 100 for generating the work layer image 110 may comprise a ground penetrating radar system, an ultrasound system, an audible range sound system, an electrical current system or any other suitable system for generating an electromagnetic field 102 through the work layer 104 to produce the work layer image 110. It should be understood that the depth and width of the work layer 104 may vary depending on the agricultural implement and operation being performed.

FIG. 23 is a schematic illustration of one embodiment of a work layer sensor 100-1 disposed in relation to a seed trench 10 formed in the soil 11 by a planter, wherein the seed trench 10 comprises the soil region of interest or work layer 104. In this embodiment, the work layer sensor 100-1 comprises a transmitter (T1) disposed on one side of the seed trench 10 and a receiver (R1) disposed on the other side of the seed trench 10 to produce the electromagnetic field 102 through the seed trench to generate the work layer image 110.

In some embodiments, the work layer sensor 100 may comprise a ground-penetration radar subsurface inspection system such as any of the following commercially available systems: (1) the StructureScan™ Mini HR available from GSSI in Nashua, N.H.; (2) the 3d-Radar GeoScope™ Mk IV coupled to a 3d-Radar VX-Series and/or DX-Series multichannel antenna, all available from 3d-Radar AS in Trondheim, Norway; or (3) the MALA Imaging Radar Array System, available from MALA Geoscience in Mala, Sweden. In such embodiments, the commercially available system may be mounted to the planter or other implement, or may be mounted to a cart which moves with the implement; in either case the system is preferably disposed to capture an image of a work layer in the area of interest (e.g., the seed trench). In some embodiments, the work layer image 110 may be generated from the signal outputs of the work layer sensor 100 using commercially available software such as GPR-SLICE (e.g., version 7.0) available from GeoHiRes International Ltd. located in Borken, Germany. In another embodiment, any ground penetrating radar can be replace with a radar that is focused on the surface and used in any of the described configurations.

Figure 24A:
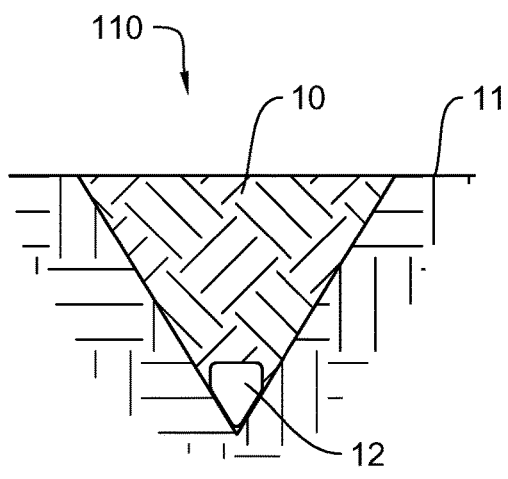
FIGS. 24A-24C are representative examples of work layer images generated by the work layer sensor of FIG. 23.
Figure 24B:
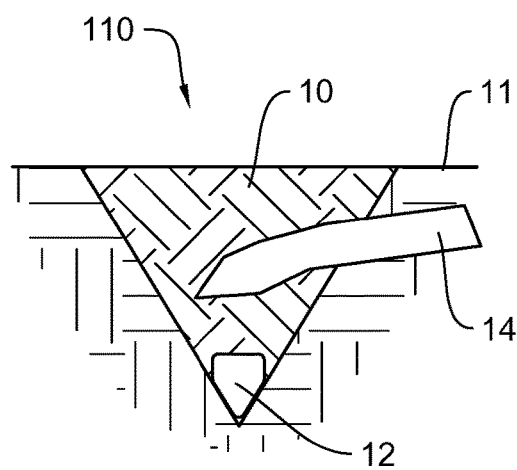
Figure 24C:
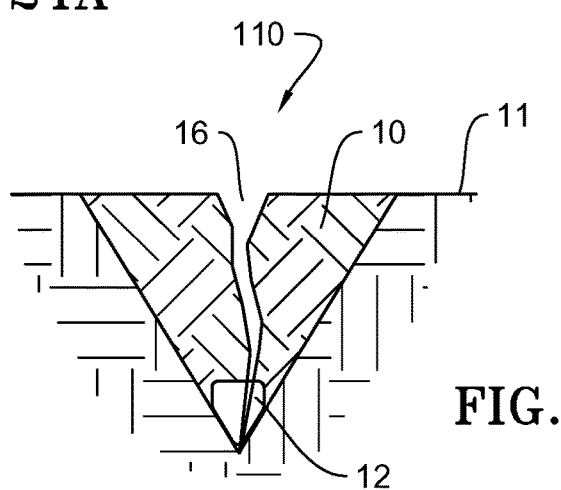

FIGS. 24A-24C are intended to be representative examples of work layer images 110 generated by the work layer sensor 100-1 of FIG. 23 showing various characteristics of the seed trench 10, including, for example, the trench depth, the trench shape, depth of seed 12, the seed depth relative to the trench depth, crop residue 14 in the trench, and the void spaces 16 within the trench. As described in more detail later, the work layer images 110 may be used to determine other characteristics of the work layer 104, including, for example, the seed-to-soil contact, percentage of trench closed, percentage of upper half of trench closed, percentage of lower half of trench closed, moisture of the soil, etc.

Figure 26A:
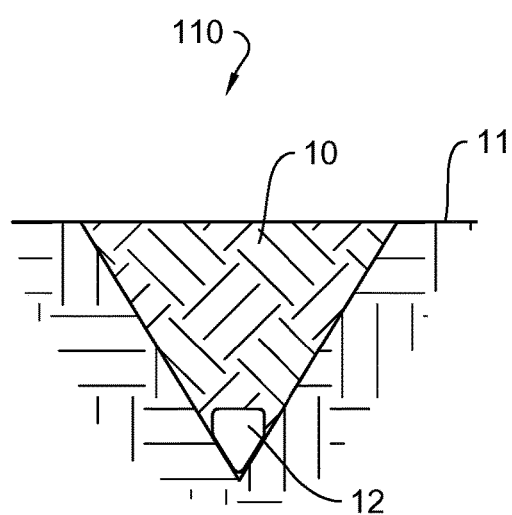
FIG. 26A-26B are representative examples of work layer images generated by the work layer sensor of FIG. 25.
Figure 26B:
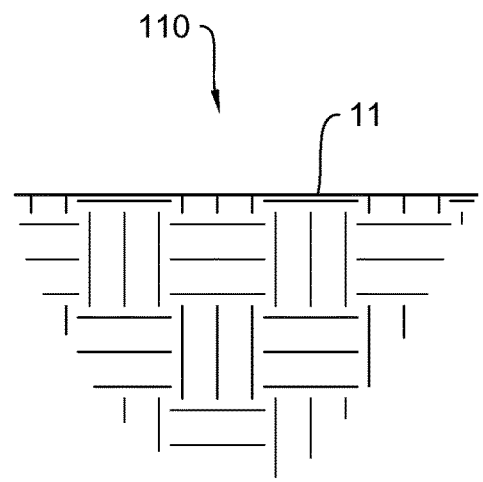

FIG. 25 schematically illustrates, in plan view, another embodiment of a work layer sensor 100-2 disposed with respect to a seed trench 10. In this embodiment, a transmitter (T1) is disposed on one side of the seed trench 10, a first receiver (R1) is disposed on the other side of the seed trench 10, and a second receiver (R2) is disposed adjacent and rearward of the transmitter (T1). FIG. 26A is a representative illustration of the work layer image 110 generated through the trench between the transmitter (T1) and the first receiver (R1)) and FIG. 26B is a representative illustration of the work layer image 110 generated between the transmitter (T1) and the second receiver (R2) providing an image of the undisturbed soil adjacent to the seed trench.

FIG. 27 is an elevation view schematically illustrating another work layer sensor embodiment 100-3 disposed with respect to a seed trench 10. In this embodiment, the work layer sensor 100-3 comprises a plurality of transmitter and receiver pairs disposed above and transverse to the seed trench 10.

Figure 28:
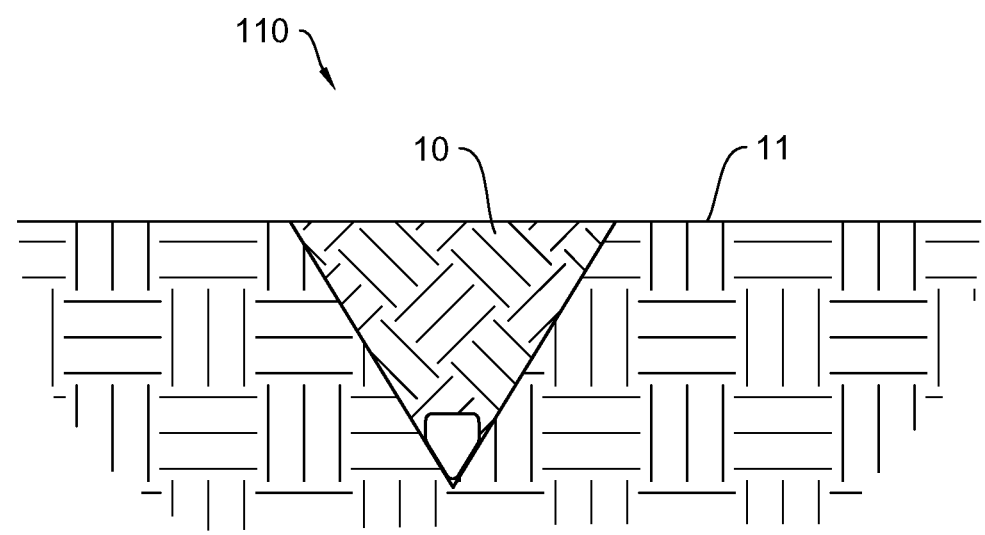
FIG. 28 is a representative example of a work layer image generated by the work sensor of FIG. 27.

FIG. 28 is a representative illustration of the work layer image 110 generated by the work layer sensor 100-3 of FIG. 27 which provides a view not only of the seed trench but also a portion of the soil adjacent to each side of the seed trench.

For each of the work layer sensor embodiments 100-1, 100-2, 100-3, the frequency of operation of the work layer sensors 100 and the vertical position of the transmitters (T) and receivers (R) above the soil and the spacing between the transmitters (T) and receivers (R) are selected to minimize signal to noise ratio while also capturing the desired depth and width of the soil region of interest (the work layer 104) for which the work layer image 110 is generated.

FIG. 1 illustrates one example of a particular application of the work layer sensors 100 disposed on a row unit 200 of an agricultural planter. The row unit 200 includes a work layer sensor 100A disposed on a forward end of the row unit 200 and a work layer sensor 100B disposed rearward end of the row unit 200. The forward and rearward work layer sensors 100A, 100B may comprise any of the embodiments of the work layer sensors 100-1, 100-2, 100-3 previously described.

The forward work layer sensor 100A is disposed to generate a reference work layer image (hereinafter a "reference layer image") 110A of the soil prior to the soil being disturbed by the planter, whereas the rearward work layer sensor 100B generates the work layer image 110B, which in this example, is the image of the closed seed trench 10 in which the seed has been deposited and covered with soil. For the reasons explained later, it is desirable to obtain both a reference image 110A and the work layer image 110B for analysis of the soil characteristics through the work layer 104.

It should be appreciated that the forward and rearward work layer sensors 100A, 100B referenced in FIG. 1 may employ any of the embodiments 100-1, 100-2 or 100-3 previously described. However, it should be appreciated that if the embodiments 100-2 or 100-3 are employed, the forward work layer sensor 100A may be eliminated because the embodiments 100-2 and 100-3 are configured to generate the work layer images 110 of undisturbed soil adjacent to the seed trench 10 which could serve as the reference layer image 110A.

It should be appreciated that rather than positioning the work layer sensors 100 as shown in FIG. 1, the work layer sensors may be positioned after the row cleaner assembly 270 and before the trench opening assembly 220 or in one or more other locations between the trench opening discs 222 and the closing wheels 254 or the packing wheel 264 depending on the soil region or characteristics of interest.

Figure 29:
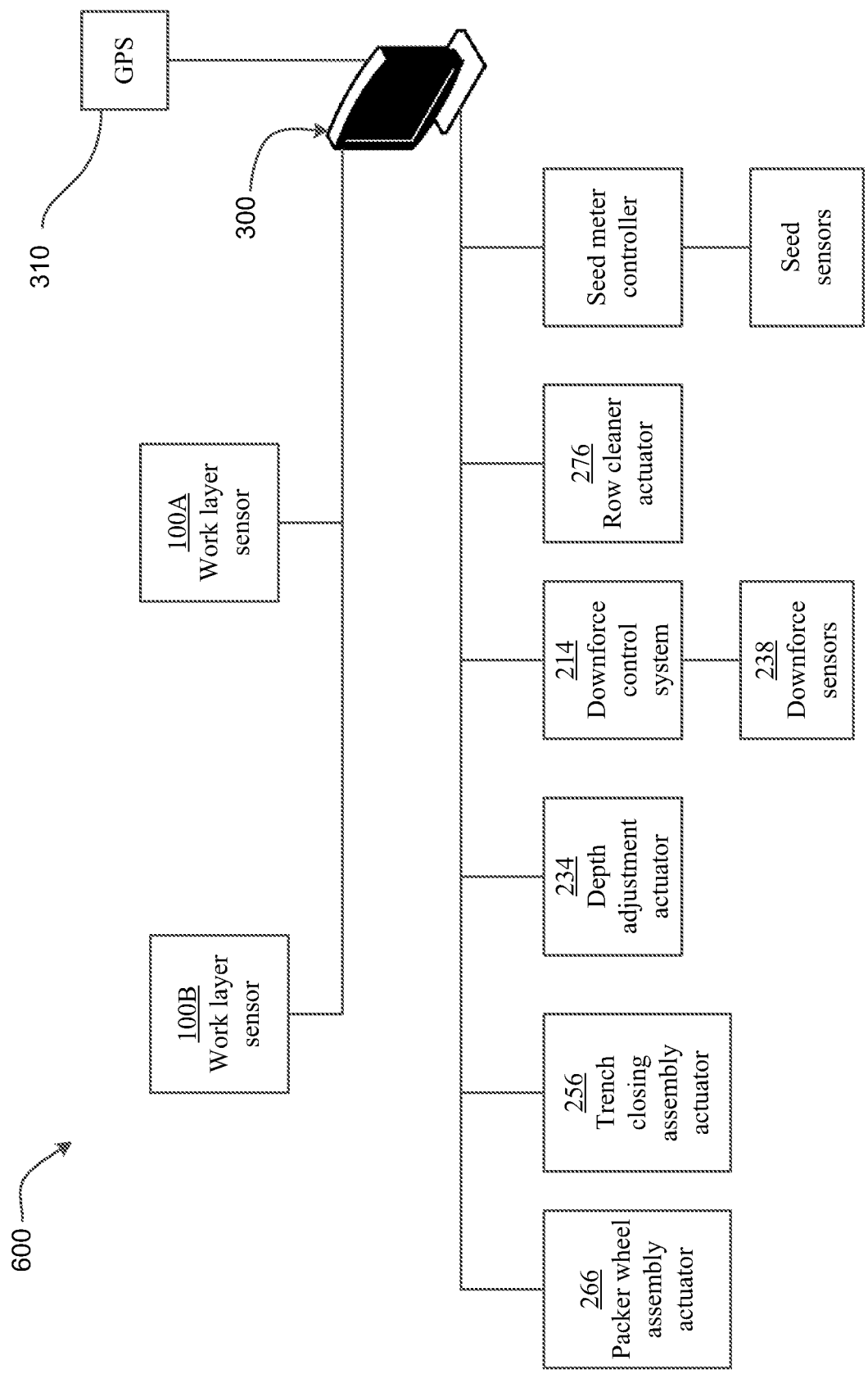
FIG. 29 illustrates an embodiment of a work layer implement monitoring, control and operator feedback system.

FIG. 29 is a schematic illustration of a system 600 which employs work layer sensors 100 to provide operator feedback and to control the planter row unit 200. Work layer sensors 100A, 100B are disposed to generate a reference layer image 110A of undisturbed soil and a work layer image 110B of the closed seed trench (i.e., after seed is deposited, covered with soil by the closing wheel assembly 250 and the soil packed with the packing wheel assembly 260). As previously described, the work layer sensors 100A, 100B may be separate work layer sensors disposed forward and rearward of the row unit 200 as illustrated in FIG. 1, or the work layer sensors 100A, 100B may comprise a single work layer sensor with transmitters (T) and receivers (R) disposed to generate both a reference layer image 110A and a work layer image 110B.

The work layer image 110B may be communicated and displayed to the operator on a monitor 300 comprising a display, a controller and user interface such as a graphical user interface (GUI), within the cab of the tractor.

The monitor 300 may be in signal communication with a GPS unit 310, the row cleaner actuator 276, the downforce control system 214, the depth adjustment actuator 234, the trench closing assembly actuator 256 and the packer wheel assembly actuator 266 to enable operational control of the planter based on the characteristics of the work layer image 110B.

For example, if the work layer image 110B indicates that residue in the seed trench 10 is above a predetermined threshold (as explained below), a signal is generated by the monitor 300 to actuate the row cleaner actuator 276 to increase row cleaner downforce. As another example, if the seed depth is less than a predetermined threshold (as explained below), a signal is generated by the monitor 300 to actuate the downforce control system 214 to increase the downforce and/or to actuate the depth adjustment actuator 234 to adjust the gauge wheels 234 relative to the opening discs 232 to increase the trench depth. Likewise if the seed depth is greater than a predetermined threshold, a signal is generated by the monitor 300 to actuate the downforce control system 214 to decrease the downforce and/or to actuate the depth adjustment actuator 234 to decrease the trench depth. As another example, if the upper portion of the trench has more than a threshold level of void space (as explained below), a signal is generated by the monitor 300 to actuate the trench closing wheel assembly actuator 256 to increase the downforce on the closing wheels 254. As another example, if the lower portion of the trench has more than a threshold level of void space (as explained below), a signal is generated by the monitor 300 to actuate the packer wheel assembly actuator 266 to increase the downforce on the packer wheel 264.

In still other examples, the work layer image 110B may identify and/or analyze (e.g., determine depth, area, volume, density or other qualities or quantities of) subterranean features of interest such as tile lines, large rocks, or compaction layers resulting from tillage and other field traffic. Such subterranean features may be displayed to the user on the monitor 300 and/or identified by the monitor 300 using an empirical correlation between image properties and a set of subterranean features expected to be encountered in the field. In one such example, the area traversed by the gauge wheels (or other wheels) of the planter (or tractor or other implement or vehicle) may be analyzed to determine a depth and/or soil density of a compaction layer beneath the wheels. In some such examples, the area of the work layer image may be divided into subregions for analysis based on anticipated subterranean features in such sub-regions (e.g., the area traversed by the gauge wheels may be analyzed for compaction).

In other examples, the monitor 300 may estimate a soil property (e.g., soil moisture, organic matter, or electrical conductivity, water table level) based on image properties of the work layer image 110B and display the soil property to the user as a numerical (e.g., average or current) value or a spatial map of the soil property at geo-referenced locations in the field associated with each soil property measurement (e.g., by correlating measurements with concurrent geo-referenced locations reported the GPS unit 310).

Alternatively or additionally, the monitor 300 could be programmed to display operational recommendations based on the characteristics of the work layer image 110B. For example, if the work layer image 110B identifies that the seed 12 is irregularly spaced in the trench 10 or if the seed 12 is not being uniformly deposited in the base of the trench, or if the spacing of the seed 12 in the trench does not match the anticipated spacing of the seed based on the signals generated by the seed sensor or speed of the seed meter, such irregular spacing, non-uniform positioning or other inconsistencies with anticipated spacing may be due to excess speed causing seed bounce within the trench or excess vertical acceleration of the row unit. As such, the monitor 300 may be programmed to recommend decreasing the planting speed or to suggest increasing downforce (if not automatically controlled as previously described) to reduce vertical acceleration of the planter row units. Likewise to the extent the other actuators 276, 214, 234, 256, 266 are not integrated with the monitor controller, the monitor may be programmed to display recommendations to the operator to make manual or remote adjustments as previously described based on the characteristics of the work layer image 110B.

Figure 30:
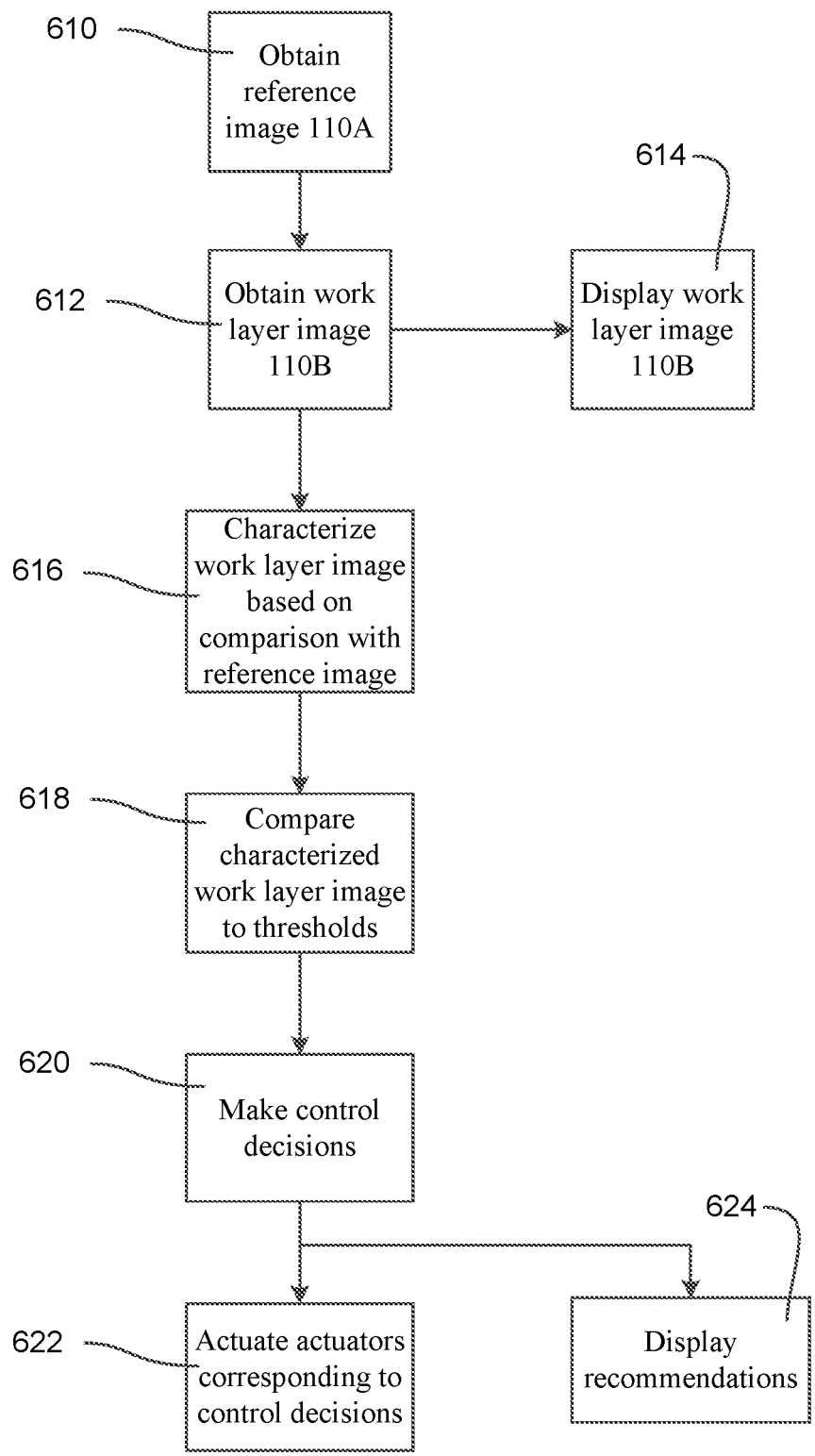
FIG. 30 is a chart showing a process for work layer implement monitoring, control and operator feedback.

FIG. 30 illustrates the process steps for controlling the planter and providing operator feedback. At steps 610 and 612, the reference image 110A and work layer image 110B is generated by the work image sensor(s) 100. At step 614, the work layer image 110B may be displayed to the operator on the monitor 300 in the cab of the tractor. At step 616, the reference layer image 110A is compared with the work layer image 110B to characterize the work layer image. At step 618, the characterized work layer image 110B is compared to predetermined thresholds. At step 620, control decisions are made based on the comparison of the characterized work layer image 110B with the predetermined thresholds. At step 622, the planter components may be controlled by the monitor 300 generating signals to actuate one or more of the corresponding actuators 276, 214, 234, 256, 266 and/or at step 624, corresponding recommendations may be displayed to the operator on the monitor display.

To characterize the work layer image 110B at step 616, the monitor 300 compares one or more characteristics (e.g., density) of the reference image 110A with the same characteristics of the work layer image 110B. In some embodiments, a characterized image may be generated comprising only portions of the work layer image differing from the reference image by at least a threshold value. The characterized image may then be used to identify and define features of the work layer image 110B, such as the trench shape, the trench depth, residue in the trench, seeds and seed placement within the trench, void spaces within the trench, and density differences of the soil within the trench.

For example, to determine the seed depth, the seed is identified or identifiable from the work layer image 110B by determining regions within the work layer image having a size or shape corresponding to a seed and having a density range empirically corresponding to seed.

Once a region is identified as a seed, the vertical position of the seed with respect to the soil surface is readily measurable or determined.

As another example, the amount of residue in the trench can be determined by (a) defining the area of the trench cross-section (based on soil density differences between the reference image 110A and the work layer image 110B); (b) by identifying the regions within the trench having a density range empirically corresponding to residue; (c) totaling the area of the regions corresponding to residue; and (d) dividing the residue area by the trench cross-sectional area.

B. Leveling Sensors

Figure 31:
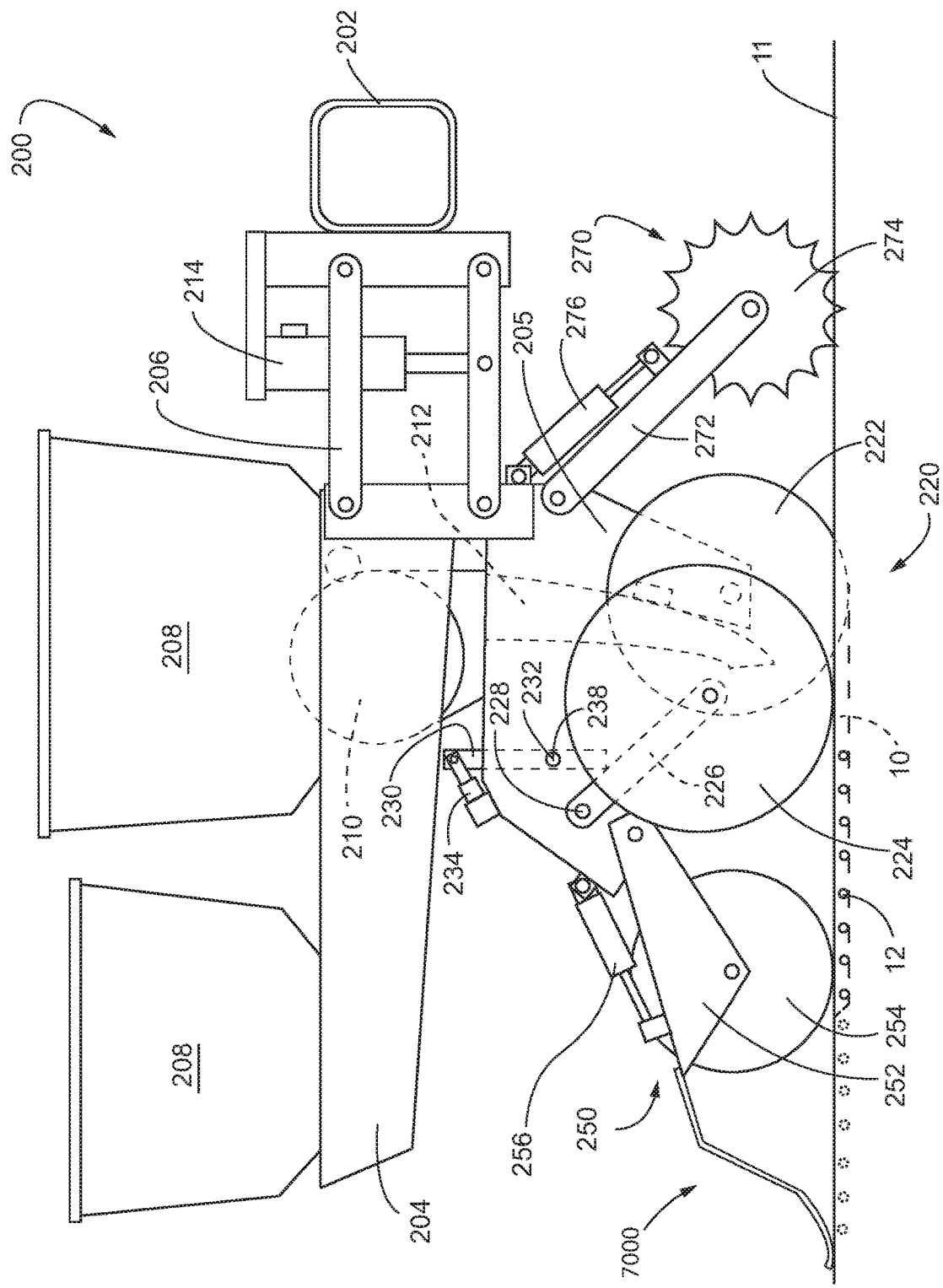
FIG. 31 illustrates an embodiment of a leveling sensor disposed on a closing system.

As shown in FIG. 31, leveling sensor 7000 may be provided to determine the levelness of the soil after the trench is closed by the closing wheels as well as levelness of the soil between rows. The leveling sensor 7000 may be contact sensors comprising spring steel wires supported on one or more arms which measure displacement of the spring steel wires as the wires drag over the top of the soil behind the closing wheels or between rows. Alternatively, the contact leveling sensors may comprise a chain which drags over the top of the soil behind the closing wheels or between the rows with a sensor to determine drag force variations. Alternatively, the contact sensor may comprise a flap that drags over the top of the soil behind the closing wheels or between rows in which the shape or amount of bending of the flap is measured. Alternatively, an accelerometer may be disposed on the flap to measure levelness of the soil. Rather than contact sensors, the leveling sensor 7000 may comprise a non-contact sensor, such as LIDAR, time of flight camera, GPR, or sonar may be disposed behind the closing wheels and between the rows.

C. Thrown Soil Sensors

Figure 32:
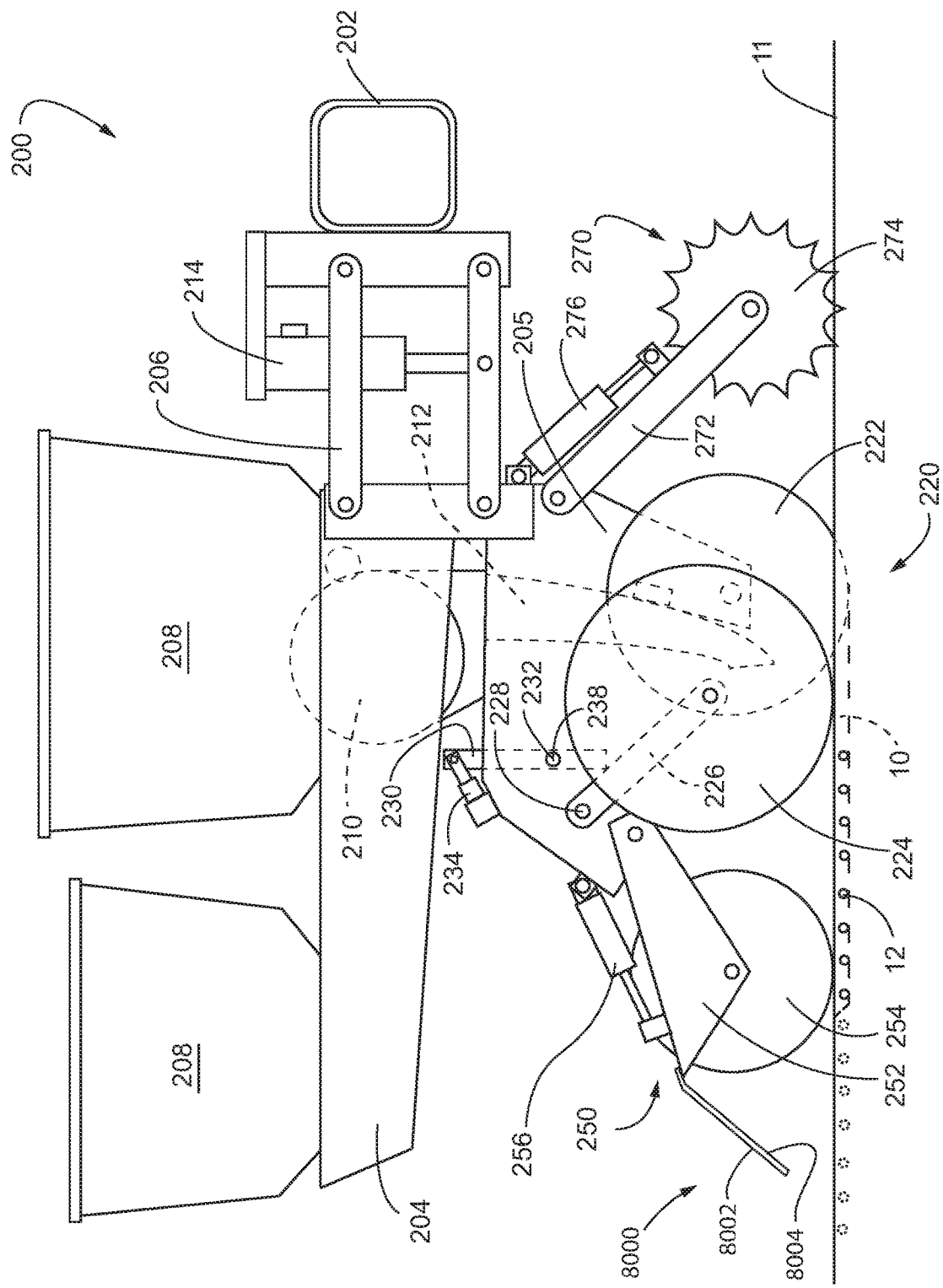
FIG. 32 is an embodiment of a thrown soil sensor disposed on a closing system.

FIG. 32 illustrates an embodiment of a thrown soil sensor 8000 for measuring how well a trench is closed by measuring whether any soil is thrown away from the closed trench. Similar to a "rooster tail" thrown by a motor boat traveling through water, the amount of soil thrown by the closing system can be measured. In the embodiment of FIG. 32, the thrown soil sensor 8000 includes a plate 8002 attached to the back of the trench closing assembly 250. The plate 8002 has a force sensor 8004 for measuring the impact of soil thrown against the plate 8002. An example of a force sensor 8004 that may be adapted for use in the thrown soil sensor 8000 is the grain impact sensor disclosed in U.S. Patent Publication No. US2014/0174199, which is incorporated herein by reference in its entirety.

Figure 33:
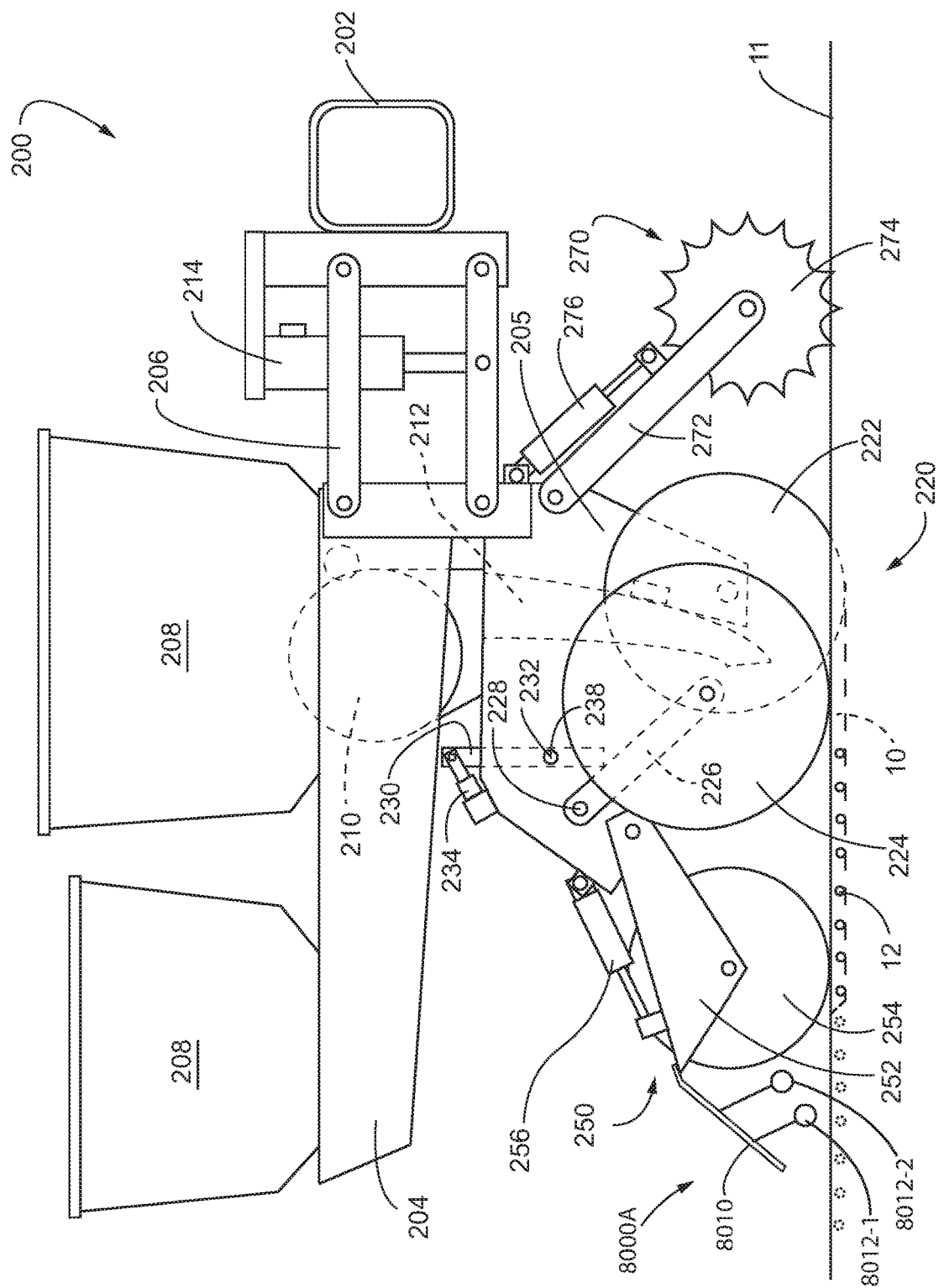
FIG. 33 is another embodiment of a thrown soil sensor disposed on a closing system.

FIG. 33 illustrates another embodiment of a thrown soil sensor 8000A. In this embodiment, the thrown soil sensor 8000A has an arm 8010 attached to the back of the trench closing assembly 250. A pair of beam sensors 8012-1 and 8012-2 are disposed on arm 8010. A beam (e.g., light or ultrasonic) is transmitted and received between beam sensors 8012-1 and 8012-2, with one being at least a transmitter and one being at least a receiver. Both beam sensors 8012-1 and 8012-2 could be both a transmitter and a receiver, and different frequencies could be used. In another embodiment (not shown), the thrown soil sensors 8000, 8000A may be installed on other agricultural equipment, such as a tillage unit, to measure soil thrown by the agricultural equipment.

D. Trench Depth Sensors

Figure 34:
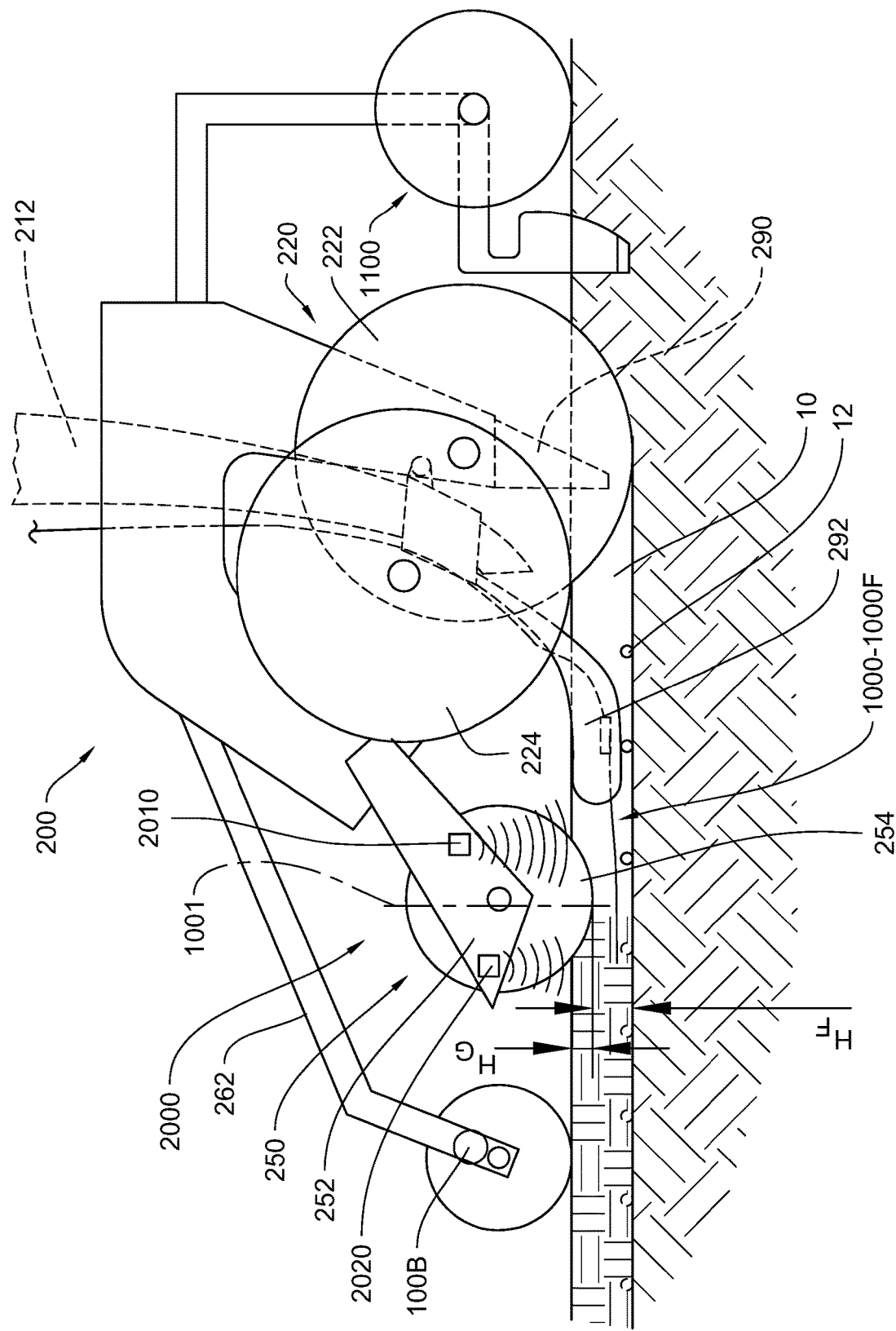
FIG. 34 illustrates an embodiment of a trench closing sensor and sensor system disposed on a closing system.

FIG. 34 shows an embodiment of a trench depth sensor system 2000. The trench depth sensor system 2000 has one or both of a trench sensor 2010 and ground sensor 2020. The trench sensors 2010 and ground sensor 2020 may be ultrasonic or radar sensors. Trench sensor 2010 is disposed on closing system 250 after the opening assembly 220 in a direction of travel to sense the distance to the bottom of seed trench 10. Ground sensor 2020 is disposed on row unit 200 after trench sensor 2010 in a direction of travel to sense the distance to soil surface 1. Both trench sensor 2010 and ground sensor 2020 are at a fixed distance to the bottom of closing wheels 254, and both are in communication with monitor 300. The depth ($H_G$) of closing wheels 254 in the soil can be determined by subtracting a distance measured by ground sensor 2020 from the distance of ground sensor 2020 to the bottom of closing wheels 254. The distance ($H_F$) of closing wheels 254 above the bottom of seed trench 10 can be determined by subtracting the distance of trench sensor 2010 to the bottom of closing wheels 254 from a distance measured by trench sensor 2010. One or both of these measurements may also be used in combination with the measurements of the trench closing sensor 1000-1000F to determine closing effectiveness. Trench sensor 2010 and ground sensor 2020 may each independently be an ultrasonic sensor, radar, or a laser.

E. Closing Assembly Angle Sensors

Figure 35:
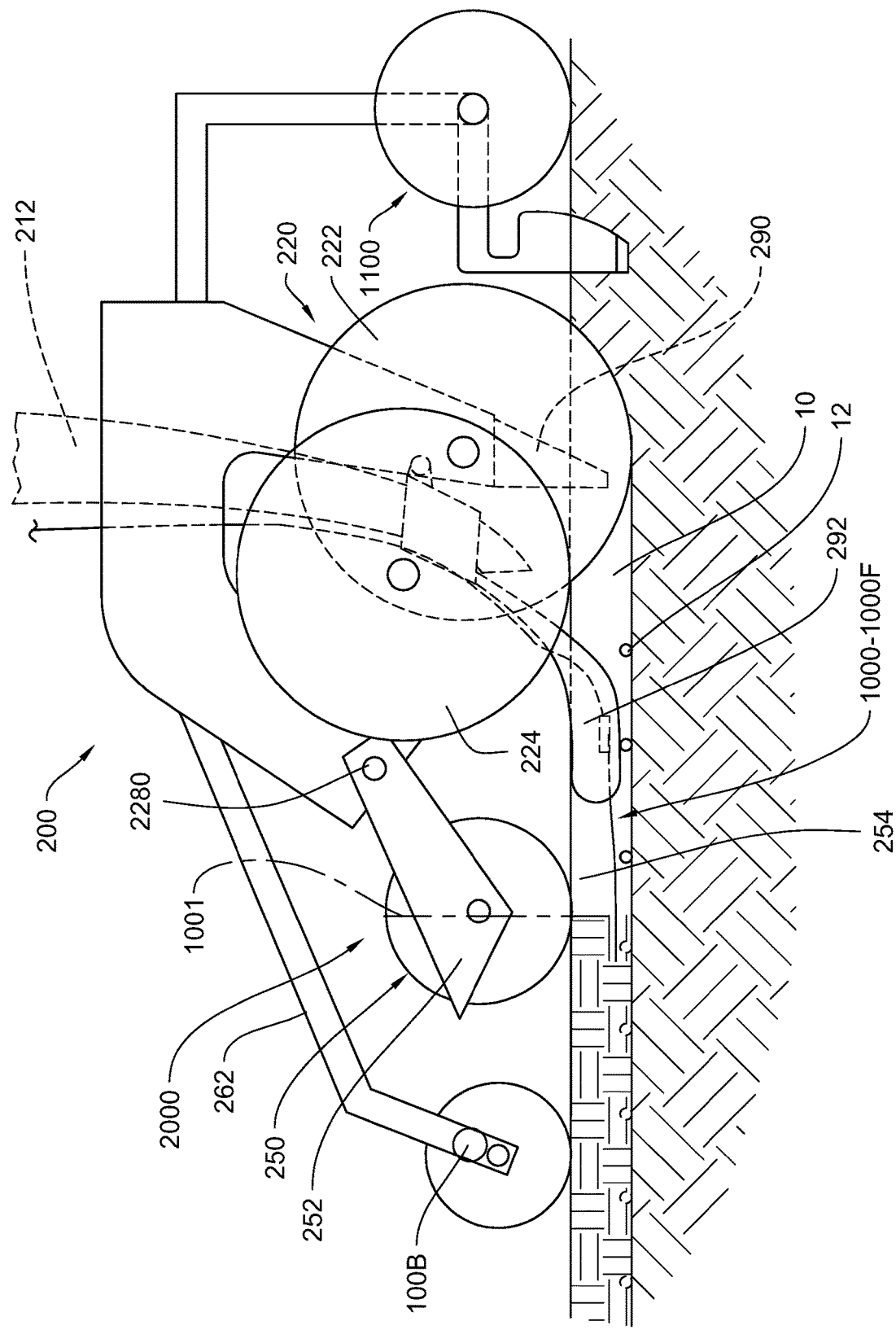
FIG. 35 illustrates an embodiment of a trench closing sensor and an angular sensor disposed on a closing system.

In another embodiment as illustrated in FIG. 35, an angle sensor 2280 can be disposed at the connection of closing wheel arm 252 and frame 204, and angle sensor 2280 is in communication with monitor 300. The angle sensor 2280 can be the same as the pivot arm angle sensor 280 in WO2014/066650. The angular output of angle sensor 2280 can be combined with the measurements of the trench closing sensor 1000-1000F to determine closing effectiveness of the seed trench. Examples of angle sensor 2280 include, but are not limited to, rotary potentiometer and Hall-effect sensor.

III. Planter Control and Operator Feedback

The signals generated by the in-trench sensors 1000-1000F, 3000, 4000, 5000, 6000 or out-of-trench sensors 100, 2000, 2280, 7000, 8000 may be communicated by signal wires 1014 or other wired or wireless communication to the monitor 300 as the actual measurement or the monitor 300 may be programmed to convert and display on the monitor screen the actual force, tension or pressure measured by the sensor 1000-1000F or the other trench characteristics measured by the sensors 3000, 4000, 5000, 6000 or by the sensors 100, 2000, 2280, 7000, 8000. If the desired displayed force or other trench characteristic is outside the desired range, the downforce on the closing wheel 254 may be adjusted. The adjustment of the closing wheel downforce may be adjusted manually by adjusting the position of a conventional coil spring corresponding to discrete preload settings. Alternatively, if the closing wheel assembly 250 is equipped with trench closing wheel assembly actuator 256 as previously described, the operator may manually actuate the trench closing wheel assembly actuator 256 as needed to increase or decrease the amount of downforce exerted by the closing wheels 254 to keep the force measured by the trench closing sensor 1000-1000F within the desired range or other characteristics within the desired range measured by the other sensors 100, 2000, 2280, 3000, 4000, 5000, 6000, 7000, 8000. Alternatively, the monitor 300 may be programmed to automatically actuate the trench closing wheel assembly actuator 256 to increase or decrease the downforce on the closing wheels 254 depending on whether the trench closing sensor 1000-1000F detects that the force, tension or pressure on the drag wire(s) 1002 falls below or exceeds a predefined minimum and maximum threshold force or if other characteristics not within the desired range measured by the other sensors 100, 2000, 2280, 3000, 4000, 5000, 6000, 7000, 8000. In yet another embodiment, rather than adjusting the downforce on the closing wheel assembly 250 via a conventional coil spring or actuator, the angle of the closing wheels may be adjusted to increase or decrease the aggressiveness of the closing wheels. For example, as is known in the art, an actuator or mechanical adjustment (not shown) may be provided to decrease or increase the angle of the closing wheels with respect to the direction of travel or with respect to vertical thereby adjusting the amount of soil the closing wheels push into the seed trench. If a closing wheel angle actuator is provided to adjust the closing wheel angle, the operator may actuate the actuator manually or the monitor 300 may be programmed to automatically actuate the actuator to adjust the aggressiveness of the closing wheels depending on the force detected by the trench closing sensors 1000-1000F or other characteristics detected by the other in trench sensors 3000, 4000, 5000 or other out of trench sensors 100, 2000, 2080, 6000, 7000.

Figure 36:
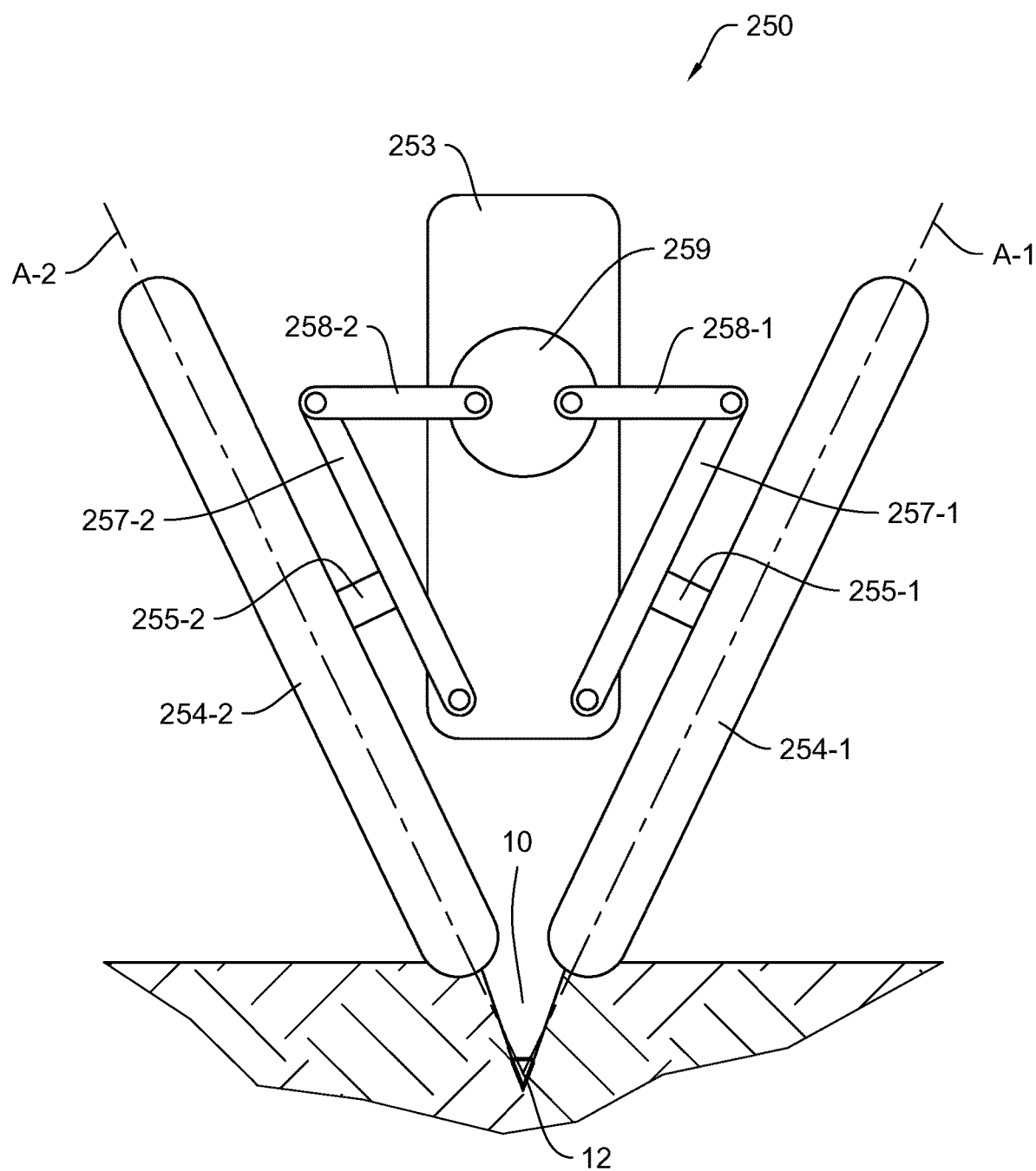
FIG. 36 is a rear view of the closing wheels looking in the direction of travel positioned over a trench having a seed.

FIG. 36 illustrates how the camber angle of the closing wheels may be adjusted so that axis A-1 and A-2 through the closing wheels 254-1 and 254-2 intersect the seed 12 in the trench 10. The work layer sensors described above may be used to locate the seed 12 in the trench 10. The position of the closing system 250 with respect to any of the work layer sensors is known, and closing wheels 254-1 and 254-2 may be adjusted by actuator 259 to adjust the camber angle of closing wheels 254-1 and 254-2. Alternatively, the camber angle may be adjusted to intersect the bottom of trench 10. In certain embodiments, it may be assumed that seed 12 is at the bottom of trench 10. The bottom of trench 10 may be determined by any instrument that determines the depth of trench 10. Non-limiting examples of instruments that may determine the depth of trench 10 are disclosed in CN101080968, CN201072894, DE102004011302, JP0614628, JP2069104, JP04360604, JP08168301, JP2001299010, JP2006345805, U.S. Pat. Nos. 4,413,685, 4,775,940, 5,060,205, 6,216,795, 8,909,436, US20150289438, US20160037709, WO2012102667, WO2015169323, and International Application No. PCT/US2017/043565 all of which are incorporated herein by reference with respect to the disclosed distance/depth determination subject matter. The angle may then be determined by assuming that the trench is centered between closing wheels 254-1 and 254-2. In the embodiment of FIG. 36, closing system 250 includes a closing frame member 253. Closing wheels 254-1 and 254-2 are attached to axles 255-1 and 255-2, respectively. Axles 255-1 and 255-2 are connected to axle arms 257-1 and 257-2, respectively, which are pivotably connected to frame member 253 and actuator arms 258-1 and 258-2, respectively, which are pivotably connected to the actuator 259. The actuator 259 is in communication with monitor 300, wherein the actuator 259 receives signals to rotate, which causes actuator arms 258-1 and 258-2 to move closer or farther from the center of closing frame 253 to cause the angle of axle arms 257-1 and 257-2 with respect to closing frame member 253 to change, which, in turn, changes the camber angles of closing wheels 254-1 and 254-2. While shown with one actuator 259, there can be two actuators 259-1 and 259-2 with axle arm 258-1 connected to actuator 259-1 and axle arm 258-2 connected to actuator 259-2 to allow for independent adjustment of the camber angles of closing wheels 254-1 and 254-2 (not shown).

Alternatively, or additionally, the packer wheel assembly 260 may be adjusted based on the tension, pulling force or pressure detected by the drag wire(s) 1002. The adjustment of the packer wheel downforce may be adjusted manually by adjusting the position of a conventional coil spring corresponding to discrete preload settings, or, if the packer wheel assembly 260 is equipped with an actuator 266 as previously described, the operator may manually actuate the actuator 266 or the monitor 300 may be programmed to automatically actuate the actuator 266 to increase or decrease the amount of downforce exerted on the packer wheel 264 to keep the force, tension or pressure measured by the trench closing sensor 1000-1000F within the desired range or other trench characteristics within the desired range.

FIGS. 37 and 38 are schematic illustrations of a system 500 which employs the trench closing sensors 1000-1000F and reference sensors 1100-1100B to provide operator feedback and to control the closing wheel assembly 250 and packer wheel assembly 260 of the planter row unit 200. At steps 510 and 512, the reference sensor 1100 detects the strain (via the strain gauge 1110) exerted on the arm 1104. At step 512, the strain exerted on the arm 1104 is correlated to define the range of force, tension or pressure that should be detecting if the seed trench is being adequately closed by the trench closing assembly 250. At step 514 the trench closing sensor 1000-1000F detects the force, tension or pressure exerted by the soil on the drag wire(s) 1002. At step 516 the force, tension or pressure exerted by the soil on the drag wire(s) 1002 of the trench closing sensor 1000-1000F may be displayed to the operator on the monitor 300 in the cab of the tractor in relation to the correlated range of the force, tension or pressure that the trench closing sensor 1000-1000F should be detecting if the seed trench is being adequately closed by the trench closing assembly 250. At step 518, control decisions are made based on the comparison of the characterized range with the force, tension or pressure detected by that the trench closing sensor 1000-1000F. At step 520, the closing wheel assembly 250 or the packer wheel assembly 260 may be controlled by the monitor 300 generating signals to actuate one or more of the corresponding actuators 256, 266 and/or at step 522, corresponding recommendations may be displayed to the operator on the monitor display.

Various embodiments of the invention have been described above for purposes of illustrating the details thereof and to enable one of ordinary skill in the art to make and use the invention. The details and features of the disclosed embodiments are not intended to be limiting, as many variations and modifications will be readily apparent to those of skill in the art.

The invention claimed is:

1. A system for sensing characteristics of a trench in a soil surface during planting operations, the system comprising:
   a trench opening assembly configured to open a trench in the soil surface as said trench opening assembly moves in a forward direction of travel;
   a trench closing assembly disposed rearward of said trench opening assembly to close said opened trench with soil as said trench closing assembly moves in said forward direction of travel;
   an appurtenance disposed in said open trench rearward of said trench opening assembly and forward of said trench closing assembly, said appurtenance having a body supporting at least one sensor configured to provide characteristics of said trench,
   wherein said at least one sensor includes a distance sensor disposed on said appurtenance body, said distance sensor selected from one of: radar, sonar, ultrasonic or LIDAR, said distance sensor measuring a distance from a rear of said appurtenance to an area of said trench closed by said trench closing assembly.

2. The system of claim 1, further comprising a second sensor that is supported on said appurtenance body in an area of said trench forward of said trench closing assembly, said second sensor is configured to detect at least one of: trench sidewall smoothness, trench sidewall knitting, soil density, soil moisture, dry dirt ingress, and soil electrical conductivity.

3. The system of claim 2, wherein said second sensor is configured to detect said trench sidewall smoothness or said trench sidewall knitting and is selected from the group consisting of: GPR, LIDAR, a time-of-flight camera, a mini-penetrometer, and an electrical conductivity sensor.

4. The system of claim 2, wherein said second sensor is configured to detect said soil density and is selected from the group consisting of: an electrical conductivity sensor, an inductance sensor, and GPR and CMP analysis.

5. The system of claim 2, wherein said second sensor is configured to detect said soil moisture and is an electrical conductivity sensor.

6. The system of claim 2, wherein said second sensor is configured to detect dry dirt ingress and is selected from the group consisting of: an electrical conductivity sensor, an inductance sensor, and a camera capable of visually displaying soil color.

7. The system of claim 1, wherein said at least one sensor further includes electric probes disposed on opposing sides of said appurtenance body, said electric probes generating signals indicative of alignment of said appurtenance body with a bottom of said trench.

8. The system of claim 1, further comprising a camera disposed on said appurtenance body, said camera providing a rearward-looking view of the trench to provide visual indication of trench geometry and alignment of said appurtenance body with a bottom of said trench.

9. The system of claim 1, further comprising a camera disposed on said appurtenance body, said camera providing a rearward-looking view of the trench to provide visual indication if seeds are being kicked from a bottom of said trench by said trench closing assembly.

10. The system of claim 1, further comprising a light/reflectivity sensor.

11. The system of claim 1, further comprising a temperature sensor disposed on said appurtenance body, said temperature sensor measuring temperature of soil in an area of said trench.

12. The system of claim 1, further comprising:
a work layer imaging sensor disposed outside of said trench, said work layer imaging sensor selected from a group consisting of: GPR, ultrasound, audible range sound or electric current, wherein said work layer imaging sensor generates a work layer image of an area of soil of interest.

13. The system of claim 12, wherein said work layer imaging sensor is disposed over an area of said trench closed with soil by said trench closing assembly, and wherein said work layer image provides characteristics of said closed trench area, said characteristics including any of: trench depth, trench shape, depth of seed in said trench, seed depth relative to trench depth, crop residue in said closed trench, and void spaces in said closed trench.

14. The system of claim 13, wherein said work layer imaging sensor includes a transmitter disposed on one side of said trench closed with soil and a receiver disposed on another side of said closed trench.

15. The system of claim 13, wherein said work layer imaging sensor includes a transmitter disposed on one side of said trench closed with soil, a first receiver disposed on another side of said closed trench and a second receiver disposed adjacent and rearward of said transmitter on said one side of said closed trench.

16. The system of claim 13, wherein said work layer imaging sensor includes a plurality of transmitter and receiver pairs disposed above said trench closed with soil and transverse to said forward direction of travel.

17. The system of claim 12, wherein the system includes a first work layer sensor disposed forward of said trench opening assembly and a second work layer sensor disposed rearward of said trench opening assembly, said first work layer sensor generating a first work layer image as a reference image, said second work layer sensor generating a second work layer image.

18. The system of claim 1, further comprising:
a leveling sensor disposed outside of said trench, said leveling sensor determining the levelness of the soil after an area of said trench closed with soil by said trench closing assembly.

19. The system of claim 18, wherein said leveling sensor includes at least one arm disposed to drag over said closed trench, and a sensor configured to measure displacement of said at least one arm, whereby displacement measurements of said at least one arm dragging over said closed trench correlate to soil levelness.

20. The system of claim 18, wherein said leveling sensor includes a chain disposed to drag over said closed trench, and a sensor configured to measure drag force of said chain, whereby said drag force measurements correlate to soil levelness.

21. The system of claim 18, wherein said leveling sensor includes a flap disposed to drag over said closed trench, and a sensor configured to measure an amount of bend of said flap, whereby said bend amount measurements correlate to soil levelness.

22. The system of claim 18, wherein said leveling sensor includes a flap disposed to drag over said closed trench, and an accelerometer disposed on said flap to measure soil levelness.

23. The system of claim 1, further comprising:
a thrown soil sensor, said thrown soil sensor including a plate attached to said trench closing assembly; and
a force sensor disposed on said plate for measuring impact of soil thrown against said plate by said trench closing assembly.

24. The system of claim 1, further comprising:
a thrown soil sensor, said thrown soil sensor including an arm attached to said trench closing assembly; and
beam sensors disposed on said arm to measure soil thrown by said trench closing assembly.

25. The system of claim 1, further comprising:
a trench depth sensor disposed on said trench closing assembly forward of an area of said trench closed with soil by said trench closing assembly, said trench depth sensor selected from a group consisting of: ultrasonic, radar and laser, said trench depth sensor measuring a distance to a bottom of said open trench.

26. The system of any of claim 25, further comprising:
a ground sensor disposed on said trench closing assembly rearward of said trench depth sensor and over an area of said trench closed with soil by said trench closing assembly, said ground sensor selected from a group consisting of: ultrasonic, radar and laser, said ground sensor measuring a distance to a surface of said closed trench, whereby a depth of said trench is determined by subtracting said distance measured by said ground sensor from said distance measured by said trench depth sensor.

27. The system of claim 1, further comprising:
a closing wheel angle sensor, said closing wheel angle sensor selected from a group consisting of: a rotation sensor, a potentiometer and a Hall-effect sensor, wherein said closing wheel angle sensor measures an angle between a closing wheel arm and a frame member of said trench closing assembly.

\* \* \* \* \*